US006964999B1

(12) United States Patent
Nakagawa et al.

(10) Patent No.: US 6,964,999 B1
(45) Date of Patent: Nov. 15, 2005

(54) POLYMER AND CURABLE COMPOSITION

(75) Inventors: Yoshiki Nakagawa, Kobe (JP); Masayuki Fujita, Kobe (JP); Kenichi Kitano, Kobe (JP)

(73) Assignee: Kaneka Corporation, Osaka (JP)

(*) Notice: Subject to any disclaimer, the term of this patent is extended or adjusted under 35 U.S.C. 154(b) by 0 days.

(21) Appl. No.: 09/622,931

(22) PCT Filed: Mar. 1, 1999

(86) PCT No.: PCT/JP99/00979

§ 371 (c)(1),
(2), (4) Date: Nov. 13, 2000

(87) PCT Pub. No.: WO99/43719

PCT Pub. Date: Sep. 2, 1999

(30) Foreign Application Priority Data

| | | |
|---|---|---|
| Feb. 27, 1998 | (JP) | 10/047304 |
| Jun. 19, 1998 | (JP) | 10/172958 |
| Jul. 23, 1998 | (JP) | 10/207324 |
| Aug. 27, 1998 | (JP) | 10/242101 |
| Aug. 27, 1998 | (JP) | 10/242102 |
| Oct. 15, 1998 | (JP) | 10/292673 |

(51) Int. Cl.[7] .......... C08F 8/00

(52) U.S. Cl. .......... 525/193; 525/61; 525/301; 525/329.7; 525/331.2; 526/93; 526/319; 526/317.1

(58) Field of Search .......... 525/61, 193, 301, 525/329.7, 331.2, 273, 260, 263, 327.6, 330.9, 332.3; 526/319, 317.1, 93; 522/79, 96

(56) References Cited

U.S. PATENT DOCUMENTS

| | | | | | |
|---|---|---|---|---|---|
| 4,137,081 | A | | 1/1979 | Pohl | |
| 4,533,482 | A | * | 8/1985 | Bollinger | 508/472 |
| 4,593,081 | A | * | 6/1986 | Bobsein et al. | 526/211 |
| 5,242,983 | A | * | 9/1993 | Kennedy et al. | 525/27 |
| 5,268,257 | A | * | 12/1993 | Mirle et al. | 430/187 |
| 5,381,735 | A | * | 1/1995 | Fifield | 101/483 |
| 5,455,315 | A | * | 10/1995 | Paine et al. | 526/79 |
| 5,483,823 | A | * | 1/1996 | Shibayama et al. | 73/118.1 |
| 5,599,552 | A | * | 2/1997 | Dunn et al. | 424/422 |
| 5,604,268 | A | * | 2/1997 | Randen et al. | 523/164 |
| 5,763,548 | A | | 6/1998 | Matyjaszewski et al. | 526/135 |
| 5,789,487 | A | | 8/1998 | Matyjaszewski et al. | 525/301 |
| 5,807,937 | A | | 9/1998 | Matyjaszewski et al. | 526/135 |
| 6,063,954 | A | * | 5/2000 | Diener et al. | 560/26 |

FOREIGN PATENT DOCUMENTS

| | | | | |
|---|---|---|---|---|
| EP | 0246918 | A1 | | 11/1987 |
| EP | 0 266 775 | | * | 5/1988 |
| EP | 0 789 036 | A2 | | 8/1997 |
| EP | 0 816 385 | A1 | | 1/1998 |
| JP | 5262808 | | | 10/1993 |
| JP | 06-329720 | | * | 11/1994 |
| WO | WO 96/30421 | | | 10/1996 |
| WO | WO 97/18247 | | | 5/1997 |
| WO | WO 98/01480 | | | 1/1998 |
| WO | WO-98/31655 | | | 7/1998 |
| WO | WO 98/40415 | | | 9/1998 |
| WO | WO-98/47931 | | | 10/1998 |

* cited by examiner

*Primary Examiner*—Tatyana Zalukaeva
(74) *Attorney, Agent, or Firm*—Connolly, Bove, Lodge & Hutz, LLP

(57) ABSTRACT

A vinyl polymer having at least one terminal group of the general formula (1) per molecule;

$$—OC(O)C(R)=CH_2 \quad (1)$$

wherein R represents hydrogen or an organic group containing 1 to 20 carbon atoms;

a curable composition containing said polymer;

an aqueous emulsion containing either said polymer or said curable composition;

a pressure sensitive adhesive composition and a pressure sensitive adhesive each comprising said curable composition or aqueous emulsion.

29 Claims, No Drawings

POLYMER AND CURABLE COMPOSITION

TECHNICAL FIELD

The present invention relates to a (meth)acryloyl-terminated vinyl polymer, a curable composition comprising said polymer, and use thereof.

BACKGROUND ART

It is known that a polymer having a terminal alkenyl group crosslinks by itself or with the aid of a curing agent such as a hydrosilyl-containing compound to give a highly heat-resistant and durable cured product. As the main chain of such a polymer, there can be mentioned, among others, a polyether polymer such as polyethylene oxide, polypropylene oxide, polytetramethylene oxide, etc.; a hydrocarbon polymer such as polybutadiene, polyisoprene, polychloroprene, polyisobutylene, etc. and hydrogenation products thereof; a polyester polymer such as polyethylene terephthalate, polybutylene terephthalate, polycaprolactone, etc.; or a polysiloxane such as polydimethylsiloxane, etc., and those polymers have been used in a variety of applications depending on the characteristics of the respective skeletal structures.

Vinyl polymers have characteristics not possessed by the above-mentioned polymers, for example high weathering resistance, high heat resistance, oil resistance, transparency, etc., and those having an alkenyl side-chain have been suggested to find application as super-weather-resist-ant coating materials [e.g. Japanese Kokai Publication Hei-3-277645; Japanese Kokai Publication Hei-7-70399].

On the other hand, alkenyl-terminated vinyl polymers can hardly be synthesized and are not prominent yet on the commercial scene.

Japanese Kokai Publication Hei-1-247403 discloses a process for producing an acrylic polymer having an alkenyl group at both terminals by using an alkenyl-containing dithiocarbamate or diallyl disulfide as a chain transfer agent.

Moreover, Japanese Kokai Publication Hei-6-211922 discloses a process for producing an alkenyl-terminated acrylic polymer which comprises preparing a hydroxy-terminated acrylic polymer using an hydroxyl group-containing polysulfide or an alcoholic compound as a chain transfer agent in the first place and, then, synthesizing an alkenyl-terminated acrylic polymer by using the reactivity of the terminal hydroxyl group.

However, it is difficult to introduce an alkenyl group into the terminal position of the polymer molecule without fail by such prior-art technology. Moreover, since these processes depend on the standard radical polymerization reaction, the molecular weight distribution (the ratio of weight average molecular weight to number average molecular weight) of the product polymer is usually as broad as two or more, thus giving rise to the problem of high viscosity. High viscosity may, in turn, cause the problem that when the polymer is utilized as a sealant or an adhesive, not only difficulties in handling but also the inability to incorporate an adequate amount of a reinforcing filler is inevitable.

Furthermore, it is not easy to introduce a (meth)acryloyl group, which has radical-polymerizing activity of its own, into vinyl polymers which are produced by radical polymerization. Particularly, few (meth)acryloyl-terminated oligomers have been successfully synthesized to this day.

Meanwhile, curable elastomeric compositions have so far been used broadly as adhesives, sealants and cushioning materials. Classified by type of curing, those compositions can be roughly divided into the so-called moisture-curing compositions which are stable under tightly sealed conditions but begin to cure at room temperature by moisture when exposed to atmospheric moisture to form elastomers and those compositions which cure on heating, for example by way of hydrosilylation reaction.

In the curable composition utilizing an actinic ray including UV light and an electron beam as well as in the thermosetting curable composition, low molecular compounds having a (meth)acryloyl group are utilized on many occasions. In such cases, the malodor produced by evaporation of unreacted low-boiling components during and after curing has been a matter of serious concern. To overcome this disadvantage, (meth)acryloyl group-containing oligomers have been employed. However, mainly from synthetic considerations, the use of such oligomers is limited to the epoxy acrylate, urethane acrylate and polyester acrylate systems and, moreover, few oligomers of large molecular weight are available. As a result, they tend to yield comparatively hard products on curing, failing to give products having satisfactory rubber elasticity.

Environmental considerations have brought about changes in coating technology. The amount of volatile organic compounds (VOC) released from coatings into the atmosphere is a matter of concern. In water-based coatings, a volatile solvent is used for promoting cohesion of latex particles and assisting in film formation. This is usually carried out by preparing a polymer or copolymer dispersion having a glass transition point (Tg) not less than room temperature, plasticizing the polymer with a volatile solvent to effectively reduce its Tg and then allowing the polymer to form a film at room temperature. As, after film formation, the solvent is evaporated off, the polymer successfully applied at a temperature not more than its intrinsic Tg is left behind. In this procedure, external heating is not required for film formation. This technology works well but is losing its perennial position on account of the recent rigorous worldwide control over the VOC level in coatings.

As a means for obviating the use of a solvent, there is available a technology such that an emulsion polymer is crosslinked after removal of water. This crosslinking method leads to improvedmechanical properties of the polymer film and, under suitable conditions, to reduced requirements of the solvent for assisting in said cohesion and film formation. However, the field capable of using crosslinking a water-based coating after removal of water is limited. A compound having a radical-polymerizable group may be mixed with a photoinitiator and, then, cured by exposure to ultraviolet light. Under suitable conditions, this crosslinking occurs regardless of whether the composition is applied in hydrous state or in dry state. The resulting film finds application as a coating, a paint or a sealant.

Acrylic pressure sensitive adhesives may exhibit well-balance adhesiveness even without addition of a tackifying resin and have been produced in large quantities alongside natural rubber-type pressure sensitive adhesives. Acrylic pressure sensitive adhesives are deficient in cohesive force, in particular, because of the molecular weight and molecular weight distribution characteristics, and this disadvantage is generally overcome by crosslinking. For this crosslinking, many methods have been developed; for example the methods comprising adding various crosslinking agents such as a polyisocyanate compound, an epoxy compound, a polycarboxylic acid, a polyamine compound, a phenolic resin and a sulfur compound.

The acrylic pressure sensitive adhesive, in general, is produced by the process in which a pressure sensitive adhesive solution obtained by the solution polymerization of a vinyl monomer system predominantly composed of an acrylic monomer in an organic solvent or an emulsion obtained by the emulsion polymerization of such a monomer system in an aqueous medium is applied to a substrate by way of coating or impregnation and dried by heating.

However, the use of a pressure sensitive adhesive solution has been found to be disadvantageous in that not only a considerable energy is required for drying the solution but it entails an atmospheric pollution and has the risk for the solvent catching a fire. When an emulsion is used, too, evaporation of water requires a still larger energy than needed for evaporation of a solvent and, in terms of performance, too, the compatible monomer species are limited so that this technology is lacking in the versatility necessary for meeting a large variety of needs for pressure sensitive adhesives.

As means for obviating the above disadvantages, photopolymerizable pressure sensitive adhesives have been proposed. In many photopolymerizable compositions of this type, low molecular compounds having a (meth) acryloyl group are employed. However, the odor due to evaporation of unreacted low-boiling components during and after curing is a matter of serious concern. Moreover, in order that a composition containing a monomer as a major component may be evenly coated on a substrate, the composition needs to have a certain degree of viscosity and, therefore, must be somehow thickened.

To overcome said odor problem, oligomers having (meth) acryloyl groups have been employed. However, such oligomers are limited to the epoxy acrylate, urethane acrylate, polyester acrylate and the like chiefly from synthesis reasons and, moreover, few oligomers of high molecular weight are available.

Japanese Kokai Publication Hei-2-60981 describes a method of thickening compositions which comprises adding an acryl rubber, or an epichlorohydrin rubber but since the rubber so added remains uncrosslinked in the pressure sensitive adhesive, the performance of the pressure sensitive adhesive is unavoidably sacrificed.

In view of the above state of the art, the present invention has for its object to provide a vinyl polymer containing a terminal (meth) acryloyl group in a high proportion, a curable composition comprising the polymer, an aqueous emulsion thereof and, as end products, an adhesive composition and a pressure sensitive adhesive comprising the same.

SUMMARY OF THE INVENTION

The present invention, therefore, is directed to a vinyl polymer having at least one terminal (meth)acryloyl group of the following general formula (1) per molecule $$—OC(O)C(R)═CH_2 \qquad (1)$$

wherein R represents hydrogen or an organic group containing 1 to 20 carbon atoms.

The present invention is further directed to a curable composition comprising said polymer.

The present invention is further directed to an aqueous emulsion comprising either said polymer or said curable composition.

The present invention is further directed to a pressure sensitive adhesive composition and a pressure sensitive adhesive each comprising said curable composition or aqueous emulsion.

The present invention is now described in detail.

DETAILED DESCRIPTION OF THE INVENTION

The present invention relates to a vinyl polymer having at least one terminal group represented by the general formula (1) per molecule.

$$—OC(O)C(R)═CH_2 \qquad (1)$$

The number of the group of the general formula (1) is not particularly restricted but if the number is less than 1 per mole of the vinyl polymer, the curabilitywill be unsatisfactory. Therefore, the number of the group of the above general formula (1) is preferably not less than 1 per molecule. The number of the group of the general formula (1) is not particularly restricted, but is preferably 1.2 to 4.

Referring to the general formula (1), R represents hydrogen or an organic group of 1 to 20 carbon atoms. Preferably, R is hydrogen or a hydrocarbon group of 1 to 20 carbon atoms, thus including such species as —H, $—CH_3$, $—CH_2CH_3$, $—(CH_2)_nCH_3$ (n=an integer of 2 to 19), $—C_6H_5$, $—CH_2OH$ and —CN, among others. More preferred are —H and $—CH_3$.

<Main Chain of Polymer>

The main chain of the vinyl polymer according to the present invention is preferably comprised of a (meth) acrylic polymer, more preferably comprised of an acrylic ester polymer. Aside from the above, a styrenic polymer is also useful.

The monomer to form the main chain of the vinyl polymer of the present invention is not particularly restricted but a variety of monomers can be selectively employed. As examples, there can be mentioned (meth)acrylic monomers such as (meth)acrylic acid, methyl (meth)acrylate, ethyl (meth)acrylate, n-propyl (meth)acrylate, isopropyl (meth) acrylate, n-butyl (meth)acrylate, isobutyl (meth)acrylate, tert-butyl (meth)acrylate, n-pentyl (meth)acrylate, n-hexyl (meth)acrylate, cyclohexyl (meth)acrylate, n-heptyl (meth) acrylate, n-octyl (meth)acrylate, 2-ethylhexyl (meth) acrylate, nonyl (meth)acrylate, decyl (meth)acrylate, dodecyl (meth)acrylate, phenyl (meth)acrylate, tolyl (meth) acrylate, benzyl (meth)acrylate, 2-methoxyethyl (meth) acrylate, 3-methoxybutyl (meth)acrylate, 2-hydroxyethyl (meth)acrylate, 2-hydroxypropyl (meth)acrylate, stearyl (meth)acrylate, glycidyl (meth)acrylate, 2-aminoethyl (meth)acrylate, γ-(methacryloyloxypropyl) trimethoxysilane, (meth)acrylic acid-ethylene oxide adduct, trifluoromethylmethyl (meth)acrylate, 2-trifluoromethylethyl (meth)acrylate, 2-perfluoroethylethyl (meth)acrylate, 2-perfluoroethyl-2-perfluorobutylethyl (meth)acrylate, 2-perfluoroethyl (meth)acrylate, perfluoromethyl (meth) acrylate, diperfluoromethylmethyl (meth)acrylate, 2-perfluoromethyl-2-perfluoroethylmethyl (meth)acrylate, 2-perfluorohexylethyl (meth)acrylate, 2-perfluorodecylethyl (meth)acrylate, 2-perfluorohexadecylethyl (meth)acrylate, etc.; styrenic monomers such as styrene, vinyltoluene, α-methylstyrene, chlorostyrene, styrenesulfonic acid and its salt; fluorine-containing vinyl monomers such as perfluoroethylene, perfluoropropylene, vinylidene fluoride, etc.; silicon-containing vinyl monomers such as vinyltrimethoxysilane, vinyltriethoxysilane, etc.; maleic anhydride, maleic acid, monoalkyl esters and dialkyl esters of maleic acid; fumaric acid and monoalkyl esters and dialkyl esters of fumaric acid; maleimide monomers such as maleimide, methylmaleimide, ethylmaleimide, propylmaleimide, butylmaleimide, hexylmaleimide, octylmaleimide, dodecylmaleimide, stearylmaleimide, phenylmaleimide, cyclohexylmaleimide, etc.; nitrile-containing vinyl monomers such as acrylonitrile, methacrylonitrile, etc.; amide-containing vinyl monomers such as acrylamide, methacrylamide, etc.; vinyl esters such as vinyl acetate, vinyl propionate, vinyl pivalate, vinyl benzoate, vinyl cinnamate, etc.; alkenes such as ethylene, propylene, etc.; conjugated dienes such as butadiene, isoprene, etc.; vinyl chloride, vinylidene chloride, allyl chloride and allyl alcohol. These monomers may be used each alone or a plurality of them may be copolymerized. Among these, from the standpoint of physical properties of the product, styrenic monomers and (meth)acrylic monomers are preferred. More preferred are acrylic ester monomers and methacrylic ester monomers. Still more preferred is butyl acrylate. In the present invention, those. preferred monomers may be copolymerized with other monomers but, in such cases, said preferred monomers should account for 40 weight % of the total composition.

The vinyl polymer of the present invention preferably has a molecular weight distribution, i.e. the ratio of weight average molecular weight to number average molecular weight as determined by gel permeation chromatography, of less than 1.8, preferably not more than 1.7, more preferably not more than 1.6, still more preferably not more than 1.5, particularly not more than 1.4, most preferably not more than 1.3. GPC determinations in the context of the present invention are generally carried out using chloroform, tetrahydrofuran or the like as the mobile phase and polystyrene gels, and the molecular weight values are estimated as polystyrene equivalents.

The number average molecular weight of the vinyl polymer of the present invention is preferably 500 to 100000, more preferably 3000 to 40000. If the molecular weight value is not more than 500, the inherent characteristics of the vinyl polymer will not be fully expressed. On the other hand, if the value is not less than 100000, difficulties in handling will be encountered.

<Polymerization>

The method of producing the vinyl polymer of the present invention is not particularly restricted.

Referring to the polymer main chain, while vinyl polymers are generally produced by anionic polymerization or radical polymerization, the polymer of the invention is preferably produced by living radical polymerization or by radical polymerization using a chain transfer agent. The particularly preferred is the former reaction.

The radical polymerization technology which can be employed for synthesizing the vinyl polymer of the present invention may be classified into the "standard radical polymerization method" which comprises copolymerizing a monomer having a defined functional group with a vinyl monomer using an azo compound, a peroxide or the like as the polymerization initiator and the "controlled radical polymerization method" by which a defined functional group can be introduced into a controlled position such as the molecular terminal.

The "standard radical polymerization method" is an expedient method but since, by this method, a monomer having a defined functional group can be introduced into the polymer only with probability, and in order to obtain a polymer of high functionality, the monomer must be used in a considerably large amount; stated differently, with the use of only a small amount of the monomer, the percentage of polymer molecules not having a defined functional group introduced is high. Moreover, since it is a free radical polymerization method, the disadvantage is inevitable that only a polymer having a broad molecular weight distribution and a high viscosity can be obtained.

The "controlled radical polymerization method" may be further classified into the "chain transfer method" in which the polymerization reaction is conducted using a chain transfer agent having a defined functional group to give a vinyl polymer terminally having the functional group and "the living radical polymerization method" in which the polymer chain grows without stopping the reaction of its terminal group until a polymer having a molecular weight substantially as designed has been produced.

The "chain transfer method" enables production of a polymer of high functionality but it requires the use of a chain transfer agent having a defined functional group in a fairly large amount and this requirement coupled with the disadvantage in after-treatment makes the method economically unfavorable. Another disadvantage is that since the reaction involved is a free-radical polymerization like said "standard radical polymerization", only apolymer having abroadmolecular weight distribution and a high viscosity can be obtained.

Unlike the above polymerization methods, the "living radical polymerization method" is advantageous in that, notwithstanding the fact that this reaction belongs to the category of radical polymerization which is generally acknowledged to be high in polymerization reaction velocity and liable to undergo chain termination reaction due to coupling of radicals etc. and hence hardly controllable, the chain termination reaction dose not readily occur so that a polymer having a narrow molecular weight distribution (Mw/Mn=about 1.1 to 1.5) can be obtained and that the molecular weight of the polymer can be freely controlled by judicious selection of the monomer-to-initiator feed ratio.

The "living radical polymerization method", thus, is not nly capable of giving a polymer of narrow molecular weight istribution and low viscosity but also capable of introducing a monomer having a defined functional group into more or less the planned position and, in this sense, is a more preferred method for the production of the vinyl polymer of the present invention.

It should be understood that while the term "living polymerization" in its strict sense means a polymerization reaction such that the molecular chain grows with its terminal being consistently active, the term is generally used to mean even a pseudo-living polymerization reaction in which the molecule grows with the terminally inactivated fraction and the terminally-active fraction remaining in equilibrium. The term as used in this specification also comprises the latter meaning.

The "living radical polymerization method" has been studied enthusiastically by many research groups in recent years. For example, the process using a cobalt porphyrin complex as described in Journal of American Chemical Society (J. Am. Chem. Soc., 116, 7943 (1994)), the process employing a radical scavenger, e.g. a nitroxide compound, as described in Macromolecules, 27, 7228 (1994), and the process using an organohalogen compound as the initiator and a transition metal complex as the catalyst which is called Atom Transfer Radical Polymerization (ATRP) can be mentioned.

Among versions of the "living radical polymerization method", the "atom transfer radical polymerization process" using an organohalogen compound or a halosulfonyl compound as the initiator and a transition metal complex as the catalyst for the polymerization of a vinyl monomer offers the advantage, in addition to above-mentioned beneficial features of "living radical polymerization method" in general, that the terminal group involved is a halogen which is comparatively advantageous for functional group exchange and provides for a greater freedom in the initiator and catalyst design and, therefore, this process is still more preferred for the production of the vinyl polymer of the present invention. The specific procedure for atom transfer radical polymerization are described in inter alia Matyjaszewski et al.: Journal of American Chemical Society (J. Am. Chem. Soc., 117, 5614 (1995), Macromolecules, 28, 7901 (1995), Science, 272, 866 (1996), WO 96/30421, WO 97/18247, and Sawamoto et al.: Macromolecules, 28, 1721 (1995).

It is not particularly restricted which method is employed for the practice of the present invention but basically the controlled radical polymerization method should be employed, and in view of the ease of reaction control, the living radical polymerization method is preferred and the atom transfer radical polymerization method is particularly preferred.

First, the polymerization method using a chain transfer agent, which is a kind of said controlled radical polymerization method, is described. The radical polymerization using a chain transfer agent (telomer) is not particularly restricted but the following two processes may be mentioned for the production of a vinyl polymer having a terminal structure permitting derivatization to the vinyl polymer of the present invention.

One of them is the process employing a halogenated hydrocarbon as the chain transfer agent to produce a halogen-terminated polymer as described in Japanese Kokai Publication Hei-4-132706 and the process for producing a hydroxy-terminated polymer which comprises using a hydroxyl-containing mercaptan compound or a hydroxyl-containing polysulfide as the chain transfer agent as described in Japanese Kokai Publication Sho-61-271306, JP 2594402, and Japanese Kokai Publication Sho-54-47782.

The living radical polymerization is now described.

First, the process using a radical scavenger such as a nitroxide compound is described. For this polymerization reaction, a nitroxy free radical (=N—O.), which is stable, is generally used as a radical capping agent. Such a compound is not particularly restricted but preferably includes nitroxy free radicals from cyclic hydroxylamine's, such as 2,2,6,6-substituted-1-piperidinyloxy radicals and 2,2,5,5-substituted-1-pyrrolidinyloxy radicals. Suitable substituents are alkyl groups of not more than 4 carbon atoms, such as methyl, ethyl, etc. Specific nitroxy free radical compounds are not particularly restricted but include, among others, 2,2,6,6-tetramethyl-1-piperidinyloxyradical (TEMPO), 2,2,6,6-tetraethyl-1-piperidinyloxy radical, 2,2,6,6-tetramethyl-4-oxo-1-piperidinyloxy radical, 2,2,5,5-tetramethyl-1-pyrrolidinyloxy radical, 1,1,3,3-tetramethyl-2-isoindolinyloxy radical and N,N-di-t-butylaminoxy radical, In lieu of nitroxy free radicals, other stable free radicals such as galvinoxyl free radicals can also be used.

The above radical capping agent is used in combination with a radical donor. It is suspected that as the reaction product of such a radical capping agent with a radical donor functions as a polymerization initiator, polymerization of an addition-polymerizable monomer proceeds. The relative amount of the two reagents is not particularly restricted but the molar ratio of radical capping agent to radical donor is preferably 1:0.1 to 10.

As the radical donor, a variety of compounds can be employed but it is preferable to use a peroxide which is capable of liberating a radical at the polymerization temperature. The peroxide is not particularly restricted but includes diacyl peroxides such as benzoyl peroxide, lauroyl peroxide, etc., dialkyl peroxides such as dicumyl peroxide, di-t-butyl peroxide, etc., peroxycarbonates such as diisopropyl peroxydicarbonate, bis(4-t-butylcyclohexyl) peroxydicarbonate, etc.; and alkyl peresters such as t-butyl peroxyoctoate, t-butyl peroxybenzoate, etc. The particularly preferred peroxide is benzoyl peroxide. Optionally, a radical-liberating azo compound such as azobisisobutyronitrile, for instance, may be used in lieu of said peroxide.

As reported in Macromolecules, 28, 2993 (1995), alkoxyamine compounds such as those shown below may be used in lieu of the combination of a radical capping agent and a radical donor.

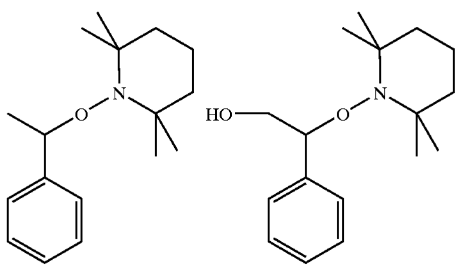

In the polymerization reaction using an alkoxyamine as the initiator, the use of a compound having a functional group, e.g. a hydroxyl group as typically illustrated above, results in formation of a polymer terminally having said functional group. From this polymer, the vinyl polymer of the present invention can be synthesized.

The monomer, solvent, temperature and other conditions for the polymerization reaction employing a radical scavenger such as said nitroxide compound are not particularly restricted but may be similar to the conditions for the atom transfer radical polymerization to be described below.

Thus, the atom transfer radical polymerization method which is a still more preferred mode of living radical polymerization according to the present invention is now described.

In the atom transfer radical polymerization process, an organohalogen compound, particularly an organohalogen compound having a highly reactive carbon-halogen bond [for example, a carbonyl compound having a halogen atom in the α-position or a compound having a halogen atom in the benzyl group], or a halosulfonyl compound is used as the initiator.

To mention specific examples, there may be mentioned $C_6H_5$—$CH_2X$, $C_6H_5$—C(H)(X)$CH_3$, $C_6H_5$—C(X)$(CH_3)_2$ (in each of the above formulas, $C_6H_5$ represents phenyl; X represents chloro, bromo or iodo), $R^3$—C(H)(X)—$CO_2R^4$, $R^3$—C($CH_3$)(X)—$CO_2R^4$, $R^3$—C(H)(X) —C(O)$R^4$, $R^3$—C($CH_3$)(X)—C(O)$R^4$ (in each of these formulas, $R^3$ and $R^4$ each represents hydrogen or an alkyl, aryl or aralkyl group of 1 to 20 carbon atoms; X represents chloro, bromo or iodo), $R^3$—$C_6H_4$—$SO_2X$ (wherein $R^3$ represents hydrogen or an alkyl, aryl or aralkyl group of 1 to 20 carbon atoms; X represents chloro, bromo or iodo), among others.

As the initiator for atom transfer radical polymerization, it is also possible to use an organohalogen compound or, halosulfonyl compound having a functional group other than a polymerization initiating functional group. In such cases, the product is a vinyl polymer having a functional group at one terminal of the main chain and a structure of said general formula (2) at the other terminal. The functional group mentioned above includes alkenyl, crosslinkable silyl, hydroxy, epoxy, amino and amido, among others.

The organohalogen compound having an alkenyl group is not particularly restricted but includes, among others, compounds having a structure represented by the general formula (6):

$$R^6R^7C(X){-}R^8{-}R^9{-}C(R^5){=}CH_2 \quad (6)$$

(wherein $R^5$ represents hydrogen or methyl; $R^6$ and $R^7$ each represents hydrogen or an alkyl, aryl or aralkyl group of 1 to 20 carbon atoms or jointly represent a ring formed by coupling to each other at free ends; $R^8$ represents —C(O)O— (ester group), —C(O)— (keto group), or an o-, m- or p-phenylene group; $R^9$ represents a direct bond or a bivalent organic group containing 1 to 20 carbon atoms and optionally containing one or more ether bonds; X represents chloro, bromo or iodo)

The substituents $R^6$ and $R^7$ each may be selected from among such specific groups as hydrogen, methyl, ethyl, n-propyl, isopropyl, butyl, pentyl and hexyl, among others. $R^6$ and $R^7$ may optionally be coupled to each other at free ends to form a cyclic skeleton.

As specific examples of the organohalogen compound having an alkenyl group as represented by the general formula (6), there can be mentioned the following:

$XCH_2C(O)O(CH_2)_nCH{=}CH_2$, $H_3CC(H)(X)C(O)O(CH_2)_nCH{=}CH_2$, $(H_3C)_2C(X)C(O)O(CH_2)_nCH{=}CH_2$, $CH_3CH_2C(H)(X)C(O)O(CH_2)_nCH{=}CH_2$,

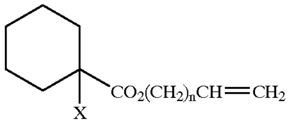

(in each of the above formulas, X represents chloro, bromo or iodo; n represents an integer of 0 to 20), $XCH_2C(O)O(CH_2)_nO(CH_2)_mCH{=}CH_2$, $H_3CC(H)(X)C(O)O(CH_2)_nO(CH_2)_mCH{=}CH_2$, $(H_3C)_2C(X)C(O)O(CH_2)_nO(CH_2)_mCH{=}CH_2$, $CH_3CH_2C(H)(X)C(O)O(CH_2)_nO(CH_2)_mCH{=}CH_2$,

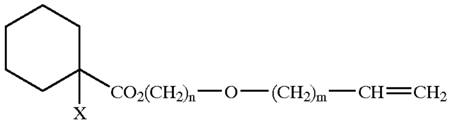

(in each of the above formulas, X represents chloro, bromo or iodo; n represents an integer of 1 to 20, and m represents an integer of 0 to 20), o, m, or p-$XCH_2{-}C_6H_4{-}(CH_2)_n{-}CH{=}CH_2$, o, m, or p-$CH_3C(H)(X){-}C_6H_4{-}(CH_2)_n{-}CH{=}CH_2$, o, m, or p-$CH_3CH_2C(H)(X){-}C_6H_4{-}(CH_2)_n{-}CH{=}CH_2$, (in each of the above formulas, X represents chloro, bromo or iodo; n represents an integer of 0 to 20), o, m, or p-$XCH_2{-}C_6H_4{-}(CH_2)_n{-}O{-}(CH_2)_m{-}CH{=}CH_2$, o, m, or p-$CH_3C(H)(X){-}C_6H_4{-}(CH_2)_n{-}O{-}(CH_2){-}CH{=}CH_2$, o, m, or p-$CH_3CH_2C(H)(X){-}C_6H_4{-}(CH_2)_n{-}O{-}(CH_2)_m{-}CH{=}CH_2$, (in each of the above formulas, X represents chloro, bromo or iodo; n represents an integer of 1 to 20, and m represents an integer of 0 to 20), o, m, or p-$XCH_2{-}C_6H_4{-}O{-}(CH_2)_n{-}CH{=}CH_2$, o, m, or p-$CH_3C(H)(X){-}C_6H_4{-}O{-}(CH_2)_n{-}CH{=}CH_2$, o, m, or p-$CH_3CH_2C(H)(X){-}C_6H_4{-}O{-}(CH_2)_n{-}CH{=}CH_2$, (in each of the above formulas, X represents chloro, bromo or iodo; n represents an integer of 0 to 20), o, m, or p-$XCH_2{-}C_6H_4{-}O{-}(CH_2)_n$fl—O $(cH_2)_m$,$-CH{=}CH_2$, o, m, or p-$CH_3C(H)(X){-}C_6H_4{-}O{-}(CH_2)_n{-}O{-}(CH_2)_m{-}CH{=}CH_2$, o, m, or p-$CH_3CH_2C(H)(X){-}C_6H_4{-}O{-}(CH_2)_n{-}O{-}(CH_2)_m{-}CH{=}CH_2$, (in each of the above formulas, X represents chloro, bromo or iodo; n represents an integer of 1 to 20, and m represents an integer of 0 to 20), As further examples of the organohalide having an alkenyl group, the compound of the general formula (7) can be mentioned.

$$H_2C{=}C(R^5){-}R^9{-}C(R^6)(X){-}R^{10}{-}R^7) \quad (7)$$

(wherein $R^5$, $R^6$, $R^7$, $R^9$ and X are respectively as defined hereinbefore; $R^{10}$ represents a direct bond, —C(O)O— (ester group), —C(O)— (keto group), or an o-, m- or p-phenylene group)

$R^8$ is a direct bond or a bivalent organic group of 1 to 20 carbon atoms (optionally containing one or more ether bond). In case it is a direct bond, the vinyl group is bound to the carbon on which the halogen is bound, so that an allyl halide compound is formed. In this case, the carbon-halogen bond has been activated by the adjacent vinyl group, so that $R^{10}$ need to be C(O)O or phenylene. In case $R^9$ is not a direct bond, $R^{10}$ is preferably a C(O)O, C(O) or phenylene group in order that the carbon-halogen bond may be activated.

The following is a partial listing of species of the compound of the general formula (7).

$CH_2{=}CHCH_2X$, $CH_2{=}C(CH_3)CH_2X$, $CH_2{=}CHC(H)(X)CH_3$, $CH_2{=}C(CH_3)C(H)(X)CH_3$, $CH_2{=}CHC(X)(CH_3)_2$, $CH_2{=}CHC(H)(X)C_2H_5$, $CH_2{=}CHC(H)(X)CH(CH_3)_2$, $CH_2{=}CHC(H)(X)C_6H_5$, $CH_2{=}CHC(H)(X)CH_2C_6H_5$, $CH_2{=}CHCH_2C(H)(X){-}CO_2R$, $CH_2{=}CH(CH_2)_2C(H)(X){-}CO_2R$, $CH_2{=}CH(CH_2)_3C(H)(X){-}CO_2R$, $CH_2{=}CH(CH_2)_8C(H)(X){-}CO_2R$, $CH_2{=}CHCH_2C(H)(X){-}C_6H_5$, $CH_2{=}CH(CH_2)_2C(H)(X){-}C_6H_5$, $CH_2{=}CH(CH_2)_3C(H)(X){-}C_6H_5$, (In each of the above formulas, X represents chloro, bromo or iodo; R represents an alkyl, aryl or aralkyl group of 1 to 20 carbon atoms)

The halosulfonyl compound having an alkenyl group includes, among others:

o-, m-, or p-$CH_2$=CH—$(CH_2)_n$—$C_6H_4$—$SO_2X$, o-, m-, or p-$CH_2$=CH—$(CH_2)_n$—O—$C_6H_4$—$SO_2X$, (In each of the above formulas, X represents chloro, bromo or iodo; n is an integer of 0 to 20)

The organohalogen compound having a crosslinkable silyl group is not particularly restricted but includes compounds having a structure represented by the general formula. (8):

$$R^6R^7C(X)—R^8—R^9—C(H)(R^5)CH_2—[Si(R^{11})_{2-b}(Y)_bO]_m—Si(R^{12})_{3-a}(Y)_a \quad (8)$$

(wherein $R^5$, $R^6$, $R^7$, $R^9$ and X are as defined above; $R^{11}$ and $R^{12}$ each represents an alkyl, aryl or aralkyl group of 1 to 20 carbon atoms or a triorganosiloxy group of the formula $(R')_3SiO$— (where R' represents a univalent hydrocarbon group of 1 to 20 carbon atoms and the 3 R's may be the same or different); in case $R^{11}$ or $R^{12}$ is present in the number of two or more, the groups represented thereby may be the same or different; Y represents a hydroxyl group or a hydrolyzable group and in case Y is present in the number of two or more, the groups represented thereby may be the same or different; a represents 0, 1, 2 or 3; b represents 0, 1 or 2; m represents an integer of 0 to 19; provided, however, that the relation of a +mb ≧1 is satisfied)

The following is a partial listing of species of the compound of the general formula (8):

$XCH_2C(O)O(CH_2)_nSi(OCH_3)_3$, $CH_3C(H)(X)C(O)O(CH_2)_nSi(OCH_3)_3$, $(CH_3)_2C(X)C(O)O(CH_2)_nSi(OCH_3)_3$, $XCH_2C(O)O(CH_2)_nSi(CH_3)(OCH_3)_2$, $CH_3C(H)(X)C(O)O(CH_2)_nSi(CH_3)(OCH_3)_2$, $(CH_3)_2C(X)C(O)O(CH_2)_nSi(CH_3)(OCH_3)_2$ (in each of the above formulas, X represents chloro, bromo or iodo; n represents an integer of 0 to 20)

$XCH_2C(O)O(CH_2)_nO(CH_2)_mSi(OCH_3)_3$, $H_3CC(H)(X)C(O)O(CH_2)_n(CH_2)_mSi(OCH_3)_3$, $(H_3C)_2C(X)C(O)O(CH_2)_nO(CH_2)_mSi(OCH_3)_3$, $CH_3CH_2C(H)(X)C(O)O(CH_2)_nO(CH_2)_mSi(OCH_3)_3$, $XCH_2C(O)O(CH_2)_nO(CH_2)_mSi(CH_3)(OCH_3)_2$, $H_3CC(H)(X)C(O)O(CH_2)_nO(CH_2)_mSi(CH_3)(OCH_3)_2$, $(H_3C)_2C(X)C(O)O(CH_2)_nO(CH_2)_mSi(CH_3)(OCH_3)_2$, $CH_3CH_2C(H)(X)C(O)O(CH_2)_nO(CH_2)_mSi(CH_3)(OCH_3)_2$, (in each of the above formulas, X represents chloro, bromo or iodo, n represents an integer of 1 to 20; m represents an integer of 0 to 20)

o, m, or p-$XCH_2$—$C_6H_4$—$(CH_2)_2Si(OCH_3)_3$, o, m, or p-$CH_3C(H)(X)$—$C_6H_4$—$(CH_2)_2Si(OCH_3)_3$, o, m, or p-$CH_3CH_2C(H)(X)$—$C_6H_4$—$(CH_2)_2Si(OCH_3)_3$, o, m, or pH-$XCH_2$—$C_6H_4$—$(CH_2)_3Si(OCH_3)_3$, o, m, or p-$CH_3C(H)(X)$—$C_6H_4$—$(CH_2)_3Si(OCH_3)_3$, o, m, or p-$CH_3CH_2C(H)(X)$—$C_6H_4$—$(CH_2)_3Si(OCH_3)_3$, o, m, or p-$XCH_2$—$C_6H_4$—$(CH_2)_2$—O—$(CH_2)_3Si(OCH_3)_3$, o, m, or p-$CH_3C(H)(X)$—$C_6H_4$—$(CH_2)_2$—O—$(CH_2)_3Si(OCH_3)_3$, o, m, or p-$CH_3CH_2C(H)(X)$—$C_6H_4$—$(CH_2)_2$—O—$(CH_2)_3Si(OCH_3)_3$, o, m, or p-$XCH_2$—$C_6H_4$—O—$(CH_2)_3Si(OCH_3)_3$, o, m, or p-$CH_3C(H)(X)$—$C_6H_4$—O—$(CH_2)_3Si(OCH_3)_3$, o, m, or p-$CH_3CH_2C(H)(X)$—$C_6H_4$—O—$(CH_2)_3Si(OCH_3)_3$, o, m, or p-$XCH_2$—$C_6H_4$—O—$(CH_2)_2$—O—$(CH_2)_3Si(OCH_3)_3$, o, m, or p-$CH_3C(H)(X)$—$C_6H_4$—O—$(CH_2)_2$—O—$(CH_2)_3Si(OCH_3)_3$, o, m, or p-$CH_3CH_2C(H)(X)$—$C_6H_4$—O—$(CH_2)_2$—O—$(CH_2)_3Si(OCH_3)_3$, (in each of the above formulas, X represents chloro, bromo or iodo)

The organohalogen compound having a crosslinkable silyl group further includes compounds having the structure represented by the general formula (9):

$$(R^{12})_{3-a}(Y)_aSi—[OSi(R^{11})_{2-b}(Y)_b]_m—CH_2—C(H)(R^5)—R^9—C(R^6)(X)—R^{10}—R^7 \quad (9)$$

(wherein $R^5$, $R^6$, $R^7$, $R^9$, $R^{10}$, $R^{11}$, $R^{12}$, a, b, m, X and Y are respectively as defined above)

The following is a partial listing of such compounds.

$(CH_3O)_3SiCH_2CH_2C(H)(X)C_6H_5$, $(CH_3O)_2(CH_3)SiCH_2CH_2C(H)(X)C_6H_5$, $(CH_3O)_3Si(CH_2)_2C(H)(X)$—$CO_2R$, $(CH_3O)_2(CH_3)Si(CH_2)_2C(H)(X)$—$CO_2R$, $(CH_3O)_3Si(CH_2)_3C(H)(X)$—$CO_2R$, $(CH_3O)_2(CH_3)Si(CH_2)_3C(H)(X)$—$CO_2R$, $(CH_3O)_3Si(CH_2)_4C(H)(X)$—$CO_2R$, $(CH_3O)_2(CH_3)Si(CH_2)_4C(H)(X)$—$CO_2R$, $(CH_3O)_3Si(CH_2)_9C(H)(X)$—$CO_2R$, $(CH_3O)_2(CH_3)Si(CH_2)_9C(H)(X)$—$CO_2R$, $(CH_3O)_3Si(CH_2)_3C(H)(X)$—$C_6H_5$, $(CH_3O)_2(CH_3)Si(CH_2)_3C(H)(X)$—$C_6H_5$, $(CH_3O)_3Si(CH_2)_4C(H)(X)$—$C_6H_5$, $(CH_3O)_2(CH_3)Si(CH_2)_4C(H)(X)$—$C_6H_5$, (in each of the above formulas, X represents chloro, bromo or iodo; R represents an alkyl, aryl or aralkyl group of 1 to 20 carbon atoms)

The above organohalogen compound or halosulfonyl compound having a hydroxyl group is not particularly restricted but includes the following, among others.

HO—$(CH_2)_n$—OC(O)C(H)(R)(X)

(wherein X represents chloro, bromo or iodo; R represents hydrogen or an alkyl, aryl or aralkyl group of 1 to 20 carbon atoms; n represents an integer of 1 to 20)

The above organohalogen compound or halosulfonyl compound having an amino group is not particularly restricted but includes the following, among others.

$H_2N$—$(CH_2)_n$—OC(O)C(H)(R)(X)

(wherein X represents chloro, bromo or iodo; R represents hydrogen or an alkyl, aryl or aralkyl group of 1 to 20 carbon atoms; n represents an integer of 1 to 20)

The above organohalide compound or halosulfonyl compound having an epoxy group is not particularly restricted but includes the following, among others

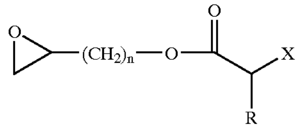

(wherein X represents chloro, bromo or iodo; R represents hydrogen or an alkyl, aryl or aralkyl group of 1 to 20 carbon atoms; n represents an integer of 1 to 20)

In order to obtain a polymer having two or more units of the terminal structure according to the invention, it is preferable to use an organohalogen compound or halosulfonyl compound having two or more initiation points. More particularly, there can be mentioned the compounds as examples.

o,m,p- $X-CH_2-C_6H_4-CH_2-X$

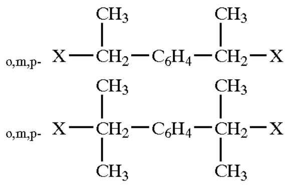

(wherein $C_6H_4$ represents a phenylene group; X represents chloro, bromo or iodo)

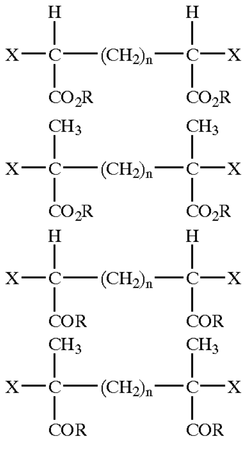

(wherein R represents an alkyl, aryl or aralkyl group of 1 to 20 carbon atoms; n represents an integer of 0 to 20; X represents chloro, bromo or iodo)

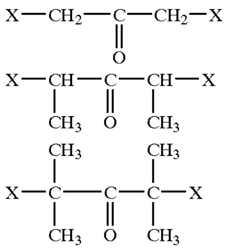

-continued

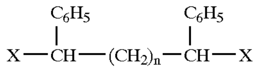

(wherein X represents chloro, bromo or iodo; n represents an integer of 0 to 20)

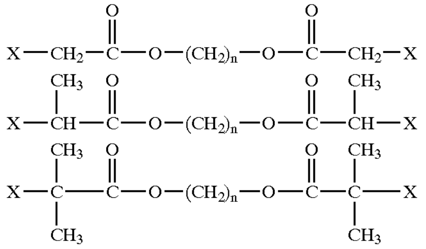

(wherein n represents an integer of 0 to 20; X represents chloro, bromo or iodo)

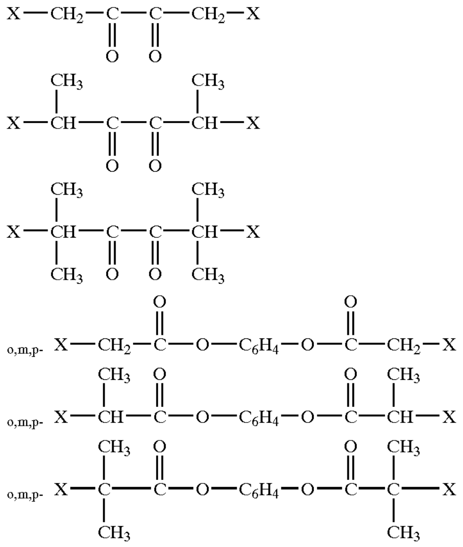

o,m,p- $X-SO_2-C_6H_4-SO_2-X$ (wherein X represents chloro, bromo or iodo)

The vinyl monomer for use in the atom transfer radical polymerization is not particularly restricted but includes all the monomers mentioned hereinbefore with advantage.

The transition metal complex for use as the polymerization catalyst in the atom transfer radical polymerization is not particularly restricted, either, but preferably includes a metal complex the central metal of which is selected from among the elements belonging to the group 7, 8, 9, 10 or 11 of the periodic table of the elements. More preferably, zero-valent copper, monovalent copper, divalent ruthenium, divalent iron and divalent nickel complexes, among others, can be mentioned. Among these, copper complexes are especiallypreferred. Themonovalent copper compound includes such species as cuprous chloride, cuprous bromide, cuprous iodide, cuprous cyanide, cuprous oxide and cuprous perchlorate. When a copper compound is used, there is added such a ligand as 2,2'-bipyridyl or a derivative thereof, 1,10-phenanthrophosphorus or a derivative thereof, or a polyamine such as tetramethylethylenediamine, pentamethyldiethylene-triamine, hexamethyltris(2-aminoethyl)amine or the like for improved catalyst activity.

The tris(triphenylphosphine) complex of ruthenium (II) chloride ($RuCl_2(PPh_3)_3$) is also ausual catalyst. When a ruthenium compound is used as the catalyst, an aluminum alkoxide is added as the activator. In addition, bis (triphenylphosphine) iron (II) chloride complex ($FeCl_2(PPh_3)_2$), bis(triphenylphosphine) nickel (II) complex ($NiCl_2(PPh_3)_2$) and bis(tributylphosphine nickel (II) complex ($NiBr_2(PBU_3)_2$) are also suitable catalysts.

The polymerization can be conducted in the absence of a solvent or in a solvent which includes various types of solvents. The solvent which can be used includes hydrocarbon series solvents such as benzene, toluene, etc.; ether series solvents such as diethyl ether, tetrahydrofuran, etc.; halogenated hydrocarbon series solvents such as methylene chloride, chloroform, etc.; ketone series solvents such as acetone, methyl ethyl ketone, methyl isobutyl ketone, etc., alcohol series solvents such as methanol, ethanol, propanol, isopropyl alcohol, n-butyl alcohol, tert-butyl alcohol, etc.; nitrile series solvents such as acetonitrile, propionitrile, benzonitrile, etc.; ester series solvents such as ethyl acetate, butyl acetate, etc.; and carbonate series solvents such as ethylene carbonate, propylene carbonate, etc., among others. These solvents can be used each alone or as a mixture of two or more species.

The polymerization reaction can be carried out within the temperature range of room temperature through 200° C., preferably 50 to 150° C.

<Method of Introduction of Functional Groups>

The procedure for introducing a terminal functional group into the polymer is now described.

The technology for introducing a group of the general formula (1) into the terminal position of the polymer obtained as above is not particularly restricted but includes the following processes.

① The process in which an olefine polymer having a terminal structure of the following general formula (2) is reacted with a compound represented by the following general formula (3).

$$—CR^1R^2X \qquad (2)$$

(wherein $R^1$ and $R^2$ each represents a group attached to the ethylenically unsaturated group of a vinyl monomer; X represents chloro, bromo or iodo)

$$M^{+-}OC(O)C(R)═CH_2 \qquad (3)$$

(wherein R represents hydrogen or an organic group of 1 to 20 carbon atoms; $M^+$represents an alkali metal or quaternary ammonium ion)

② The process in which a hydroxy-terminated vinyl polymer is reacted with a compound represented by the general formula (4).

$$XC(O)C(R)═CH_2 \qquad (4)$$

(wherein R represents hydrogen or an organic group of 1 to 20 carbon atoms; X represents chloro, bromo, or hydroxyl)

③ The process in which a hydroxy-terminated vinyl polymer is reacted with a diisocyanate compound and the residual isocyanate group is reacted with a compound represented by the general formula (5).

$$HO—R'—OC(O)C(R)═CH_2 \qquad (5)$$

(wherein R represents hydrogen or an organic group of 1 to 20 carbon atoms; R' represents a bivalent organic group of 2 to 20 carbon atoms)

Each of these processes is now described in detail.

<Method of Introduction of a Functional Group ①>

The above process (1) is now described.

① The processwhichcomprises reacting anolefinpolymer having a terminal structure of the general formula (2) with a compound represented by the general formula (3).

$$—CR^1R^2X \qquad (2)$$

(wherein $R^1$ and $R^2$ each represents a group attached to the ethylenically unsaturated group of a vinyl monomer; X represents chloro, bromo or iodo)

$$M^{+-}OC(O)C(R)═CH_2 \qquad (3)$$

(wherein R represents hydrogen or an organic group of 1~20 carbon atoms; $M^+$represents an alkali metal or quaternary ammonium ion)

The vinyl polymer having a terminal structure of the general formula (2) can be produced by the above-mentioned process which comprises polymerizing a vinyl monomer using said organohalogen or halosulfonyl compound as the initiator and said transition metal complex as the catalyst, or the process which comprises polymerizing a vinyl monomer using a halogen compound as the chain transfer agent. The preferred is the former process.

Referring to the general formula (2), $R^1$ and $R^2$ each represents a group which has been attached to the ethylenically unsaturated group of the vinyl monomer used as the starting material for the vinyl polymer.

The compound of the general formula (3) is not particularly restricted; however, R is hydrogen or an organic group of 1 to 20 carbon atoms. Preferably, R is hydrogen or a hydrocarbon group of 1 to 20 carbon atoms. Moreparticularly, —H, —$CH_3$, —$CH_2CH_3$, —$(CH_2)_nCH_3$ (n represents an integer of 2 to 19), —$C_6H_5$, —$CH_2OH$, —CN, etc. can be mentioned, and —H and —$CH_3$ are still more preferred.

$M^+$ represents a cation which forms an ion pair with the oxy anion. As the kind of $M^+$, there can be mentioned an alkali metal ion, such as lithium ion, sodium ion and potassium ion, and a quaternary ammonium ion. The quaternary ammonium ion includes but is not limited to tetramethylammonium ion, tetraethylammonium ion, tetrabenzylammonium ion, trimethyldodecylammonium ion, tetrabutylammonium ion, and dimethylpiperidinium ion. Preferred is sodium ion or potassium ion.

The amount of use of the oxy anion according to general formula (3) is preferably 1 to 5 equivalents, more preferably 1.0 to 1.2 equivalents, based on the halogen of the terminal structure of the general formula (2).

The solvent for this reaction is not particularly restricted but because this is a nucleophilic substitution reaction, a polar solvent is preferably used. Thus, tetrahydrofuran, dioxane, diethyl ether, acetone, dimethyl sulfoxide, dimethylformamide, dimethylacetamide, hexamethylphosphoric triamide and acetonitrile, among others, can be used with advantage.

The reaction temperature is not particularly restricted but may generally be within the range of 0 to 70° C. In order that the polymerizable terminal group may be retained intact, the reaction is preferably carried out at a temperature not over 50° C., more preferably at room temperature.

<Introduction of a Terminal Functional Group ②>

The process ② is now described.

② The process which comprises reacting a hydroxy-terminated vinyl polymer with.a compound represented by the general formula (4)

$$XC(O)C(R){=}CH_2 \quad (4)$$

(wherein R represents hydrogen or an organic group of 1 to 20 carbon atoms; X represents chloro, bromo, or hydroxyl)

The compound represented by the general formula (4) is not particularly restricted as far as R is hydrogen or an organic group of 1 to 20 carbon atoms. Preferably, R is hydrogen or a hydrocarbon group of 1 to 20 carbon atoms. More particularly, —H, $—CH_3$, $—CH_2CH_3$, $—(CH_2)_nCH_3$ (n represents an integer of 2 to 19), $—C_6H_5$, $—CH_2OH$, —CN, etc. can be mentioned. More preferred are —H and $—CH_3$.

The hydroxy-terminated vinyl polymer can be produced by the process which comprises polymerizing a vinyl monomer using said organohalogen or halosulfonyl compound as the initiator and said transition metal complex as the catalyst, or the process which comprises polymerizing a vinyl monomer using a hydroxy-containing compound as the chain transfer agent, although the former. method is preferred. The procedure for producing a hydroxy-terminated vinyl monomer in the above manner is not restricted but includes the following schemes, among others.

(a) The scheme for synthesizing a vinyl polymer by living radical polymerization wherein a compound having both a polymerizable alkenyl group and a hydroxyl group per molecule as represented by the following general formula (10) is reacted as a second monomer.

$$H_2C{=}C(R^{13})—R^{14}—R^{15}—OH \quad (10)$$

(wherein $R^{13}$ represents hydrogen or an organic group of 1 to 20 carbon atoms, preferably methyl, and may be the same or different; $R^{14}$ represents —C(O)O— (ester group) or an o-, m- or p-phenylene group; $R^{15}$ represents a direct bond or a bivalent organic group containing 1 to 20 carbon atoms and optionally having one or more ether bonds. The compound in which $R^{14}$ is an ester group is a (meth)acrylate monomer, and the compound in which $R^{14}$ is a phenylene group is a styrenic monomer).

The timing of reacting such a compound having both a polymerizable alkenyl group and a hydroxyl group per molecule is not particularly restricted but, particularly when the expression of rubber-like properties is especially desired, the compound is preferably reacted as a second monomer in a terminal stage of polymerization or at completion of the reaction of the determined monomer.

(b) The scheme for synthesizing a vinyl polymer by living radical polymerization wherein a compound having both a less polymerizable alkenyl group and a hydroxyl group per molecule is reacted as a second monomer in a terminal stage of polymerization or after completing the reaction of the determined monomer.

The compound mentioned above is not particularly restricted but may for example be a compound of the following general formula (11).

$$H_2C{=}C(R^{13})—R^{16}—OH \quad (11)$$

(wherein $R^{13}$ is as defined above; $R^{16}$ represents a bivalent organic group containing 1 to 20 carbon atoms and optionally having one or more ether bonds)

The compound of the above general formula (11) is not particularly restricted but, from availability points of view, an alkenyl alcohol such as 10-undecenol, 5-hexenol and allyl alcohol is preferred.

(c) The scheme for introducing a hydroxyl group into the terminal position of a vinyl polymer by a process in which, as typically disclosed in Japanese Kokai Publication Hei-4-132706, a vinyl polymer having at least one terminal carbon-halogen bond structure of the general formula (2) as obtainable by atom transfer radical polymerization is hydrolyzed or subjected to reaction with a hydroxy-containing compound to introduce a hydroxyl group in the place of the halogen atom.

(d) The scheme in which a vinyl polymer having at least one carbon-halogen bond structure of the general formula (2) as obtainable by atom transfer radical polymerization is reacted with a stabilized carbanion having a hydroxyl group as typically represented by the general formula (12) to substitute it for halogen.

$$M^+C^-(R^{17})(R^{18})—R^{16}—OH \quad (12)$$

(wherein $R^{16}$ is as defined above; $R^{17}$ and $R^{18}$ each represents an electron-withdrawing group stabilizing the carbanion $C^-$or one of $R^{17}$ and $R^{18}$ represents such an electron-withdrawing group with the other representing hydrogen, an alkyl group of 1 to 10 carbon atom, or a phenyl group. The electron-withdrawing group mentioned for $R^{17}$ and $R^{18}$ includes $—CO_2R$ (ester group), —C(O)R (keto group), $—CON(R_2)$ (amido group), —COSR (thioester group), —CN (nitrile group) and $—N0_2$ (nitro group), among others. The substituent R, indicated just above, is an alkyl group of 1 to 20 carbon atoms, an aryl group of 6 to 20 carbon atoms or an aralkyl group of 7 to 20 carbon atoms, preferably an alkyl group having 1 to 10 carbon atoms or a phenyl group. As particularly preferred groups for $R^{17}$ and $R^{18}$, there can be mentioned $—CO_2R$, —C(O)R and —CN).

(e) The scheme in which a vinyl polymer having at least one terminal carbon-halogen bond structure of the general formula (2) as obtainable by atom transfer radical polymerization is reacted with an elemental metal, such as zinc, or an organometal compound to prepare an enolate anion which is then reacted with an aldehyde or a ketone.

(f) The scheme in which a vinyl polymer having at least one terminal halogen atom, preferably one represented by the general formula (2), is reacted with a hydroxy-containing oxy anion as typically represented by the following general formula (13) or a hydroxy-containing carboxylate anion as typically represented by the following general formula (14) to substitute a hydroxy-containing group for said halogen.

$$HO—R^{16}—O^-M^+ \quad (13)$$

(wherein $R^{16}$ and $M^+$ are as defined above)

$$HO—R^{16}—C(O)O^-M^+ \quad (14)$$

(wherein $R^{16}$ and $M^+$ are as defined above)

In the mode of practice wherein a halogen is not directly associated with the introduction of a hydroxyl group as in the above schemes (a) and (b), the scheme (b) is preferred for the practice of the invention from controllability points of view.

In the mode wherein a hydroxyl group is introduced by transforming the halogen of a vinyl polymer having at least one carbon-halogen bond as in the schemes (c) to (f), the scheme (f) is preferred from controllability points of view.

<Introduction of a Terminal Functional Group ③>

The process ③ is now described.

③ The process in which a hydroxy-terminated vinyl polymer is reacted with a duisocyanate compound and the residual isocyanate group is reacted with.a compound represented by the general formula (5)

$$HO—R'—OC(O)C(R)=CH_2 \quad (5)$$

(wherein R represents hydrogen or an organic group of 1 to 20 carbon atoms; R' represents a bivalent organic group of 2 to 20 carbon atoms)

The compound of the general formula (5) is not particularly restricted but includes 2-hydroxypropyl methacrylate as an example. Thus, R is hydrogen or an organic group of 1 to 20 carbon atoms. Preferably, R is hydrogen or a hydrocarbon group of 1 to 20 carbon atoms. More specifically, —H, $—CH_3$, $—CH_2CH_3$, $—(CH_2)_nCH_3$ (n represents an integer of 2 to 19), $—C_6H_5$, $—CH_2OH$, —CN, etc. can be mentioned. Still more preferred are —H and $—CH_3$.

The hydroxy-terminated vinyl monomer is the same as defined hereinbefore.

The diisocyanate compound is not particularly restricted but maybe any of the hitherto-known diisocyanate compounds such as tolylene diisocyanate, 4,4'-diphenylmethane diisocyanate, hexamethyl diisocyanate, xylylene diisocyanate, m-xylylene diisocyanate, 1,5-naphthalene diusocyanate, hydrogenated diphenylmethane diisocyanate, hydrogenated tolylene diisocyanate, hydrogenated xylylene diisocyanate and isophorone diisocyanate, among others. These diisocyanates can be used each alone or in a combination of two or more species. It is also possible to use blocked isocyanates For better expression of weathering resistance, the diisocyanate compound is preferably a diisocyanate having no aromatic ring structure, such as hexamethylene diisocyanate, hydrogenated diphenylmethane diisocyanate or the like.

<Curable Composition>

The vinyl polymer of the present invention can be formulated into a curable composition.

<Monomer/Oligomer>

The curable composition of the present invention is not particularly restricted but is predominantly composed of the vinyl polymer of the invention and preferably free from other monomers in order to prevent emanation of the odor associated with the unreacted monomers, although, for the very purpose, a certain polymerizable monomer and/or oligqmer and various additives may be formulated. The polymerizable monomer and/or oligomer is preferably a radical-polymerizable group-containing monomer/oligomer or an anionic-polymerizable group-containing monomer/oligomer.

The radical-polymerizable group mentionedabove includes (meth)acrylate and other acrylic functional groups, a styrene group, an acrylonitrile group, a vinyl ester group, an N-vinylpyrrolidone group, an acrylamide group, a conjugated diene group, a vinyl ketone group or a vinyl chloride group. Particularly preferred is a monomer/oligomer having a (meth)acrylate group which is similar to the group in the polymer of the present invention.

The anionic-polymerizable group includes a (meth) acrylate group, a styrene group, an acrylonitrile group, an N-vinylpyrrolidone group, an acrylamide group, a conjugated diene group, andavinylketonegroup, amongothers. Preferred, among them, is a monomer/oligomer having an acrylic functional group which is similar to the group in the polymer of the present invention.

As specific monomers having such groups, there can be mentioned (meth)acrylate monomers, cyclic acrylate monomers, N-vinylpyrrolidone, styrenic monomers, acrylonitrile, N-vinylpyrrolidone, acrylamide monomers, conjugated diene monomers and vinyl ketone monomers.

The (meth)acrylate monomers include n-butyl (meth) acrylate, 2-ethylhexyl (meth)acrylate, isooctyl (meth) acrylate, isononyl (meth)acrylate, and the compounds of the following formulas.

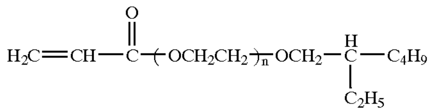

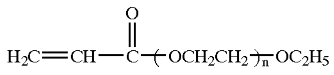

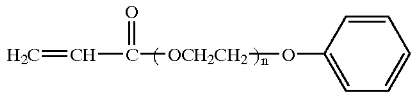

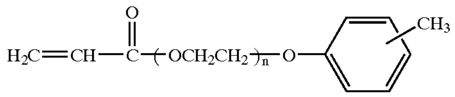

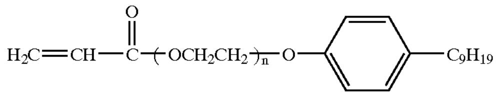

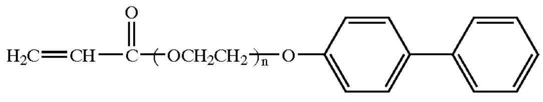

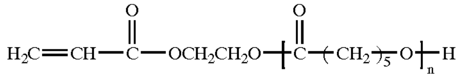

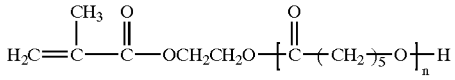

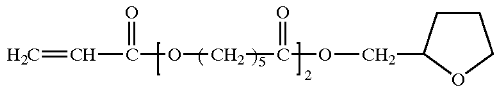

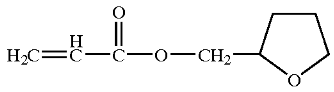

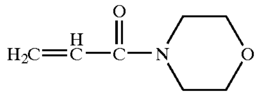

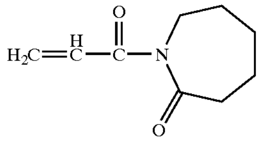

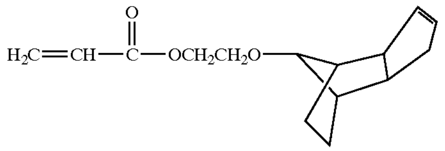

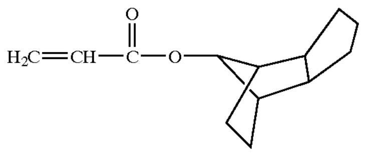

-continued

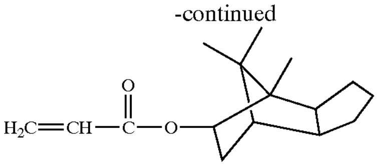

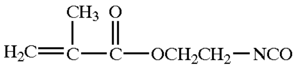

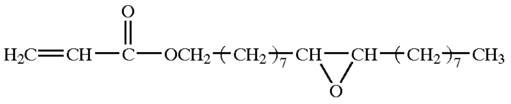

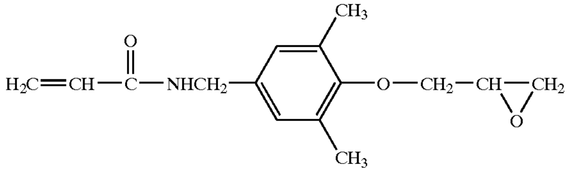

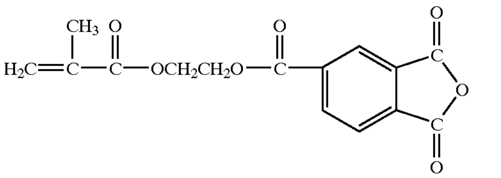

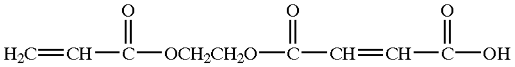

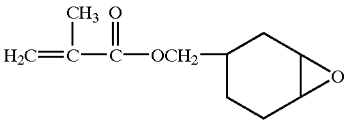

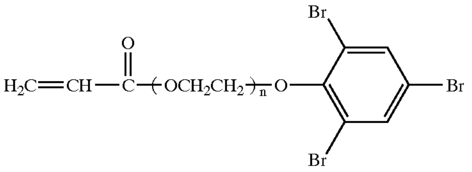

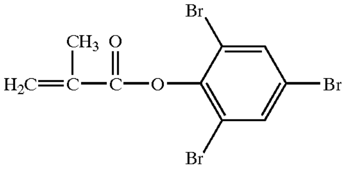

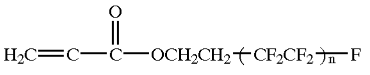

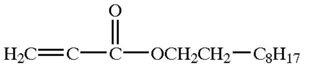

The styrenic monomers include styrene, α-methylstyrene, etc.; the acrylamide monomers include acrylamide, N,N-dimethylacrylamide, etc.; the conjugated diene monomers include butadiene, isoprene, etc.; and the vinyl ketone monomers include methyl vinyl ketone, among others.

The monomer having a plurality of groups mentioned above includes but is not limited to neopentyl glycol polypropoxy diacrylate, trimethylolpropane polyethoxy triacrylate, bisphenol F polyethoxy diacrylate, bisphenol A polyethoxy diacrylate, dipentaerythritol polyhexanolide hexaacrylate, tris(hydroxyethyl)isocyanurate polyhexanolide triacrylate, tricyclodecane dimethylol diacrylate, 2-(2-acryloyloxy-1,1-dimethyl)-5-ethyl-5-acryloyloxymethyl-1,3-dioxane, tetrabromobisphenol A diethoxy diacrylate, 4,4-dimercaptodiphenyl sulfide dimethacrylate, polytetraethylene glycol diacrylate, 1,9-nonanediol diacrylate, and ditrimethylolpropane tetraacrylate.

As oligomers having the above groups, there can be mentioned epoxy acrylate resins such as bisphenol A epoxy acrylate resin, phenol novolac epoxy acrylate resin, cresol novolac epoxy acrylate resin, etc., carboxyl-modified epoxy acrylate resins, urethane acrylate resins which are obtained as the urethane resin obtainable from a polyol (polytetramethylene glycol, ethylene glycol-adipic acid polyester diol, ε-caprolactone-modified polyester diol, polypropylene glycol, polyethylene glycol, polycarbonate diol, hydroxy-terminated hydrogenated polyisoprene, hydroxy-terminated polybutadiene, hydroxy-terminated polyisobutylene, etc.) and an organic isocyanate (tolylene diisocyanate, isophorone diisocyanate, diphenylmethane diisocyanate, hexamethylene diisocyanate, xylylene diisocyanate, etc.) is reacted with a hydroxy-containing (meth)acrylate {hydroxyethyl (meth)acrylate, hydroxypropyl (meth)acrylate, hydroxybutyl (meth)acrylate, pentaerythritol triacrylate, etc.}, resins obtainable by introducing (meth)acryl groups into said polyols through ester bonding, and polyester acrylate resins.

These monomers and oligomers are selectively used depending on the initiator and curing conditions to be employed.

The number average molecular weight of said monomer and/or oligomer having an acrylic functional group is preferably not greater than 2000, more preferably not greater than 1000, from compatibility points of view.

<Actinic Ray-curable Composition>

The curable composition of the present invention is preferably cured with an actinic light such as UV and an electron beam.

The actinic ray-curable composition preferably contains a photopolymerization initiator.

The photopolymerization initiator for use in the present invention is not particularly restricted but is preferably a photoradical initiator or a photoanion initiator, more preferably a photoradical initiator. For example, acetophenone, propiophenone, benzophenone, xanthol, fluoren, benzaldehyde, anthraquinone, triphenylamine, carbazole, 3-methylacetophenone, 4-methylacetophenone, 3-pentylacetophenone, 4-methoxyacetophenone, 3-bromoacetophenone, 4-allylacetophenone, p-diacetylbenzene, 3-methoxybenzophenone, 4-methylbenzophenone, 4-chlorobenzophenone, 4,4'-dimethoxybenzophenone, 4-chloro-41-benzylbenzophenone, 3-chloroxanthone, 3,9-dichloroxanthone, 3-chloro-8-nonylxanthone, benzoyl, benzoin methyl ether, benzoin butyl ether, bis(4-dimethylaminophenyl)ketone, benzyl methoxy ketal, 2-chlorothioxanthone and so forth. Those initiators can be used each alone or in combination with other compounds. The combination includes combinations with various amines such as diethanolmethylamine, dimethylethanolamine, triethanolamine, etc., optionally further with an indonium salt such as diphenyliodonium chloride, and combinations with dyes, such as methylene blue, and amines.

Furthermore, as the near-infrared photopolymerization initiator, a near infrared light-absorbing cationic dye can be employed. The near infrared light-absorbing cationic dye is a dye which is excited by light energy within the range of 650 to 1500 nm, preferably the near infrared light-absorbing cationic dye-borate anion complexes disclosed in Japanese Kokai Publication Hei-3-111402 and Japanese Kokai Publication Hei-5-194619 and other literature. The use of them with aboron series sensitizer is still more preferred.

The amount of use of the photopolymerization initiator may be just sufficient to make the system slightly photo-functional and is not particularly restricted. However, the range of 0.001 to 10 parts by weight per 100 parts by weight of the polymer in the composition is preferred.

The method of curing the actinic ray-curable composition of the present invention is not particularly restricted but, depending on the nature of the photopolymerization initiator, the proper method can be judiciously selected from among the various techniques such as irradiation with light using a high-pressure mercury lamp, a low-pressure mercury lamp, an electron beam irradiator, a halogen-vapor lamp, a light-emitting diode, or a semiconductor laser.

As typical specific uses for the actinic ray-curable composition of the present invention, there can be mentioned sealants, adhesives, pressure sensitive adhesives, elastic adhesives, coatings, powder coatings, foams, electric/electronic potting materials, films, gaskets, resists, various molding materials, photomodeling materials, artificial marble, and so on.

<Thermosetting Composition>

In another preferred mode, the curable composition of the present invention is cured by heat.

The thermosetting composition of this invention preferably contains a thermopolymerization initiator.

The thermopolymerization initiator which can be used in the practice of the invention is not particularly restricted but includes azo initiators, peroxides, persulfates and redox initiators.

Suitable azo initiators are not particularly restricted but include, among others, 2,2'-azobis(4-methoxy-2,4-dimethylvaleronitrile) (VAZO 33), 2,2'-azobis(2-amidinopropane) dihydrochloride (VAZO 50), 2,2$^1$-azobis(2,4-dimethylvaleronitrile) (VAZO 52), 2,2'-azobis(isobutyronitrile) (VAZO 64), 2,2'-azobis-2-methylbutyronitrile (VAZO 67), 1,1-azobis(1-cyclohexanecarbonitrile) (VAZO 88) (all available from DuPont Chemical), 2,2'-azobis(2-cyclopropylpropionitrile) and 2,2$^1$-azobis(methyl isobutyrate) (V-601) (available from Wako Pure Chemical Industries), and so on.

Suitable peroxide series initiators are not particularly restricted but include, among others, benzoyl peroxide, acetyl peroxide, lauroyl peroxide, decanoyl peroxide, dicetyl peroxydicarbonate, di (4-t-butylcyclohexyl) peroxydicarbonate (Perkadox 16S) (available from Akzo Nobel), di(2-ethylhexyl) peroxydicarbonate, t-butyl peroxypivalate (Lupersol 11) (available from Elf Atochem), t-butyl peroxy-2-ethylhexanoate (Trigonox 21-C50) (available from Akzo Nobel) and dicunyl peroxide.

Suitable persulfate series initiators are not particularly restricted but include potassium persulfate, sodium persulfate and ammonium persulfate.

Suitable redox (reduction-oxidation) initiators are not particularly restricted but include the combination of said persulfate series initiator with a reducing agent such as sodium hydrogenmetasulfite or sodium hydrogensulfite; the combination of an organic peroxide and a tertiary amine, such as a system based on benzoyl peroxide and dimethylaniline; the combination of an organic hydroperoxide and a transition metal, such as a system using cumene hydroperoxide and cobalt naphthenate, among others.

The other initiator that can be used as well is not particularly restricted, either, but a pinacol such as tetraphenyl-1,1,2,2-ethanediol can be mentioned as an example.

The preferred thermopolymerization initiator is a member selected from the group consisting of azo series initiators and peroxide series initiators. Still more preferred initiator is 2,2'-azobis(methyl isobutyrate), t-butyl peroxypivalate or di(4-t-butylcyclohexyl) peroxydicarbonate, or a mixture thereof.

The amount of use of the thermopolymerization initiator in the present invention should be a catalytically effective amount and, as such, cannot be specified in general terms. However, assuming that the total amount of the polymer of the invention and other monomer/oligomer is 100 parts by weight, the preferred addition amount is about 0.01 to 5 parts by weight and more preferred is about 0.025 to 2 parts by weight. When a mixture of different initiators is used, the total amount of such initiators may be equal to the amount needed when any one kind of initiator is used.

The technology for curing the thermosetting composition of the invention is not particularly restricted. The temperature depends on the particular species of thermopolymerization initiator, species of the polymer of the invention, and other compounds added but usually is preferably within the range of 50 to 250° C., more preferably within the range of 70 to 200° C. The curing time is also dependent on the species of polymerization initiator, monomer and solvent, reaction temperature and other factors but is generally within the range of 1 minute through 10 hours.

As typical specific uses for the thermosetting composition of the present invention, there can be mentioned sealants, adhesives, pressure sensitive adhesives, elastic adhesives, coatings, powder coatings, foams, electric/electronic potting materials, films, gaskets, resists, various molding materials, artificial marble, and so on.

<Aqueous Emulsion>

The vinyl polymer and curable composition of the present invention can each be formulated into an aqueous emulsion.

The polymer of the invention which contains at least one terminal (meth)acryloyl group can be effectively dispersed in an aqueous phase to form an aqueous emulsion (latex). Thus, a sufficient amount of the conventional nonionic, cationic or anionic surfactant (or a mixture thereof) is mixed with the polymer of the invention and this mixture is homogenized in water under a high shear force in a homogenizer or Sonolator (registered trademark). As an alternative, the polymer of the invention is mixed with water and said surfactant in the first place and this mixture is subjected to a high shear force to give an emulsion. This emulsion is optionally further mixed well with one or more other emulsified components for its adaptation to some or other intended use.

The surfactant which can be used in the present invention is not particularly restricted but any of the conventional anionic and cationic surfactants as well as a mixture of them can be employed. Such surfactants are well known in the art, and detailed descriptions can be found in J. W. McCutcheon's "Synthetic Detergents" published from MacNair-Dorland Company (New York).

Among the more specific examples of such surfactants are alkali metal or ammonium salts of long-chain alkyl esters of sulfuric acid or sulfonic acid, and alkylene oxide adducts of long-chain alcohol or fatty acid. Anionic surfactants are preferred and Triton® X-200 (available from Union Carbide Corporation, Danbury, Ct.), which is an aqueous solution of alkyl aryl polyether sodium sulfonate, is particularly preferred. The amount of use of this surfactant is not particularly restricted but may be 0.25 to 7 parts by weight Aper 100 parts by weight of the polymer.

Such aqueous emulsions can be coated on a variety of substrates and cured in situ by exposure to heat, visible light or ultraviolet light. For this application, a suitable initiator is preferably added to the emulsion and a photopolymerization initiator or a thermopolymerization initiator can be used with advantage.

The photopolymerization initiator should be compatible with the dispersed phase of the emulsion. The preferred photoinitiators are benzophenone and Darocure® 1173 of the formula $C_6H_5{=}C(O){-}C(CH_3)_2OH$. The photoinitiator is used in a sufficient amount to insure the desired curing speed. If the amount is too small, an undesirably long time will be required for consummation of curing. If the amount of thephotoinitiator is too large, the physical and mechanical properties of the aqueous emulsion or dry emulsion will be sacrificed. The preferred amount is 0.25 to 0.5 part by weight of the photoinitiator based on 100 parts by weight of the polymer.

In the emulsion of the present invention, the photoinitiator reacts in the presence of ultraviolet light to generate a radical for inducing an interaction between (meth)acryloyl groups on the polymer. As an example, the radical formed by the ultraviolet light and photoinitiator generate (meth)acryloyl groups which interact to form crosslinks. Such crosslinking reactions proceed not only in an aqueous emulsion but also in a dry emulsion. In the preferred mode, water is first separated from the emulsion and the resulting dry emulsion is exposed to UV light for crosslinking. The emulsion containing acryloxypropylene groups which are extremely-reactive are cured by exposure to ambient sunlight.

To modify the properties of the dry emulsion, an additional component can be added to the emulsion. The physical properties of the dry emulsion are augmented by addition of a toughening filler. For this purpose, reinforcing fillers such as silica and carbon black are suitable. As far as the properties and storage stability of the aqueous or dry emulsion of the invention are not adversely affected, extending fillers such as clay and calcium carbonate, pigments, dyes, thickeners, etc. can be added.

The technology for curing the aqueous emulsion of the present invention is not particularly restricted but the various techniques mentioned for said actinic ray-curable composition and thermosetting composition can be employed.

The radiation dose of ultraviolet light necessary for crosslinking the emulsion polymer of the invention depends on many variables and, therefore, the optimum dose should be chosen on a trial-and-error basis. The wavelength of UV light, the amount and species of (meth)acryloyl groups on the polymer, the amount and species of photoinitiator, and reactor design, among other factors, all have an effect on the UV dose necessary to cure the emulsion polymer.

The aqueous emulsion of the invention can be used as a surface coating composition through curing in the above manner. The dry emulsion is suited for use as a coating material, an adhesive or a sealant.

Such coatings make substrates water-proof. Typical substrates include, for example, metals such as aluminum, steel, iron and brass, masonry such as concrete, marble and stones, cellulosic materials such as paper, cotton, fiberboard, paperboard, wood, woven or nonwoven fabrics, and plastics such as polycarbonates.

The properties of cured products obtainable from the emulsion of the present invention may run the gamut from a rubbery one to a resinous one according to the molecular weight and backbone skeleton of the polymer. Therefore, as specific uses for the curable composition of the present invention, there can be mentioned sealants, adhesives, pressure sensitive adhesives, elastic adhesives, coatings, powder coatings, foams, electric/electronic potting materials, films, gaskets, resists, various molding materials, manmade marble and so on.

[Pressure Sensitive Adhesive Composition and Pressure Sensitive Adhesive]

The curable composition and aqueous emulsion of the present invention can each be formulated as a pressure sensitive adhesive composition.

The pressure sensitive adhesive composition of the present invention is predominantly composed of a (meth) acrylic polymer in its preferred mode so that a tackifier resin need not necessarily be added but, where necessary, a variety of resins can be employed. To mention some specific examples, phenolic resin, modified phenolic resin, cyclopentadiene-phenol resin, xylene resin, chroman resin, petroleum resin, terpene resin, terpene-phenol resin and rosin ester resin can be used.

The pressure sensitive adhesive composition of the present invention may be supplemented with various additives for modulating its physical characteristics, such as antioxidants, plasticizers, rheology modifiers, solvents and so on.

The (meth)acrylic polymer is inherently a durable polymer that dose not necessarily require addition of an antioxidant but, if desired, the conventional antioxidants and ultraviolet absorbers can be selectively added.

The plasticizer includes, according to need for modulating physical properties or adjusting characteristics of the polymer, esters of phthalic acid, such as dibutyl phthalate, diheptyl phthalate, di(2-ethylhexyl)phthalate, butyl benzyl phthalate, etc.; esters of nonaromatic dibasic acids, such as dioctyl adipate, dioctyl sebacate, etc.; polyalkylene glycol esters such as diethylene glycol dibenzoate, triethylene glycol dibenzoate, etc.; esters of phosphoric acid, such as tricresyl phosphate, tributyl phosphate, etc.; chlorinated paraffins; and hydrocarbon oils such as alkyldiphenyls, partially hydrogenated terphenyl, etc. These can be used each alone or as a mixture of two or more species, although the use of a plasticizer is not essential. The plasticizer may be formulated in the stage of polymer production.

The solvent mentioned above includes an aromatic hydrocarbon series solvent such as toluene, xylene, etc.; an ester series solvent such as ethyl acetate, butyl acetate, amyl acetate, cellosolve acetate, etc.; and a ketone series solvent such as methyl ethyl ketone, methyl isobutyl ketone, diisobutyl ketone, etc. These solvents maybe used in the stage of polymer production.

In addition, the pressure sensitive adhesive composition of the present invention can be supplemented with various adhesiveness-improving agent for improving adhesion to various substrates (plastic film, paper, etc.). Among such agents are alkylalkoxysilanes such as methyltrimethoxysilane, dimethyldimethoxysilane, trimethylmethoxysilane, n-propyltrimethoxysilane, etc.; alkoxysilanes having a functional group, e.g. alkylisopropenoxysilanes such as dimethyldiisopropenoxysilane, methyltriisopropenoxysilane, γ-glycidoxypropylmethyldiisopropenoxysilane, etc., γ-glycidoxypropylmethyldimethoxysilane, γ-glycidoxypropyltrimethoxysilane, vinyltrimethoxysilane, vinyldimethylmethoxysilane, γ-aminopropyltrimethoxysilane, N-(β-aminoethyl)-γ-aminopropyltrimethoxysilane, N-(β-aminoethyl)-γ-aminopropylmethyldimethoxysilane, γ-mercaptopropyltrimethoxysilane, γ-mercaptopropylmethyldimethoxysilane, etc.; silicone varnishes; and polysiloxanes.

The pressure sensitive adhesive composition of the present invention can be used broadly in the field of adhesive tapes, sheets, labels, foils and so on. For example, the pressure sensitive adhesive composition in the form of a solution, an emulsion or a hot melt can be coated on various kinds of substrates such as films of synthetic resins or modified natural materials, paper, all sorts of fabrics, metal foils, metalized plastic foils, asbestos or glass cloths, etc. and cured in situ by means of actinic ray or heat.

BEST MODE FOR CARRYING OUT THE INVENTION

The following examples and comparative examples are intended to illustrate the present invention and should by no means be construed as defining the scope of the invention.

In the following example and comparative examples, all parts and % are by weight.

In the following examples, the "number average molecular weight" and "molecular weight distribution" (the ratio of weight average molecular weight to number average molecular weight) were calculated by the standard polystyrene equivalent method using gel permeation chromatography (GPC). As the GPC column, a column of polystyrene crosslinked gel (Shodex GPC K-804; Showa Denko) was used. Chloroform was used as the GPC solvent.

In the following examples, "average number of terminal (meth)acryloyl groups" means "the number of (meth) acryloyl groups introduced per mole of the polymer" and was calculated from the number average molecular weight data generated by $^1$H NMR spectrometry and GPC.

Example 1

Synthesis of Potassium Methacrylate

A flask was charged with methanol (800 mL) cooled to 0° C. Potassium t-butoxide (130 g) was added thereto in portions. While this mixture was maintained at 0° C., a methanolic solution of methacrylic acid (100 g) was added dropwise. After completion of dropwise addition, the temperature of the reaction system was raised from 0° C. to room temperature and the volatile fraction of the reaction mixture was distilled off under reduced pressure to recover potassium methacrylate of the following formula [hereinafter referred to as compound (1)].

$CH_2{=}C(CH_3)CO_2K$

Example 2

Synthesis of Potassium Acrylate

A flask was charged with methanol (500 mL) cooled to 0° C. Potassium t-butoxide (78 g) was added thereto in portions. While this mixture was maintained at 0° C., a methanolic solution of acrylic acid (50 g) was added dropwise. After completion of dropwise addition, the temperature of the reaction system was raised from 0° C. to room temperature and the volatile fraction of the reaction mixture was distilled off under reduced pressure to recover potassium acrylate of the following formula (hereinafter referred to as compound (2)].

$CH_2{=}CHCO_2K$

Example 3

Synthesis of Methacryloyl-terminated Poly(n-butyl Acrylate))

Using copper (I) bromide as the catalyst, pentamethyldiethylenetriamine as the ligand, and diethyl 2,5-dibromoadipate as the initiator, n-butyl acrylate was polymerized to give a bromo-terminated n-butyl acrylate polymer having a number average molecular weight of 10900 and a molecular weight distribution of [Mw/Mn] ratio =1.12 (hereinafter referred to as polymer [1]). In N,N-dimethylacetamide was dissolved 20.0 g of the above polymer [1] followed by addition of 1.46 g of compound (1), and the mixture was stirred at room temperature for 2 days. This reaction mixture was diluted with ethyl acetate (50 mL) and filtered to remove the insoluble fraction. The filtrate was further diluted with ethyl acetate (150 mL) and washed with water and brine. The organic layer was dried over $Na_2SO_4$ and the volatile fraction was distilled off under reduced pressure to give a methacryloyl-terminated poly(butyl acrylate) (hereinafter referred to as polymer [2]). The average number of terminal methacryloyl groups of the purified polymer [2] was 1.52.

Example 4

To 2.0 g of polymer [2], benzophenone (25.2 mg, 0.138 mmol), diethanolmethylamine (0.079 mL, 0.691 mmol) and diphenyliodonium chloride (35.0 mg, 0.111 mmol) were added and mixed thoroughly.

A portion of the resulting composition was coated on a glass sheet and exposed to light using a high-pressure mercury lamp (SHL-100UVQ-2; Toshiba Litech) at an irradiation distance of 50 cm for 5 minutes to give a rubbery cured product.

Example 5

To 3.0 gofpolymer [2], benzophenone (0.207 mmol, 50 wt. %, in ethyl acetate) and diethanolmethylamine (0.119 mL, 1.036 mmol) were added and mixed thoroughly.

The resulting composition was poured into a frame and, after removal of volatile fraction under reduced pressure, exposed to light using a high-pressure mercury lamp (SHL-100UVQ-2; Toshiba Litech) at an irradiation distance of 50 cm for 10 minutes to give a rubbery cured product.

From the above cured product, a No. 3 mini-dumbbell testpiece was punched out and subjected to a tensile test using Shimadzu Autograph. The breaking strength was 0.34 MPa and the elongation at break was 56% (Measuring conditions: 23° C., ulling speed 200 mm/min.).

Comparative Example 1

The polymer [2] was coated on a glass sheet and exposed to light using a high-pressure mercury lamp at an irradiation distance of 50 cm for 20 minutes. No curing occurred.

Comparative Example 2

To 2.0 g of polymer [1], benzophenone (25.2 mg, 0.138 mmol), diethanolmethylamine (0.079 mL, 0.691 mmol) and diphenyliodonium chloride (35.0 mg, 0.111 mmol) were added and mixed thoroughly.

A portion of the resulting composition was coated on a glass sheet and exposed to light using a high-pressure mercury lamp (SHL-100TVQ-2; Toshiba Litech) at an irradiation distance of 50 cm for 20 minutes to give a rubbery cured product.

Example 6

Using copper (I) bromide as the catalyst, pentamethyldiethylenetriamine as the ligand, and diethyl 2,5-dibromoadipate as the initiator, n-butyl acrylate was polymerized to give a bromo-terminated poly(n-butyl acrylate) having a number average molecular weight of 10800 and a molecular weight distribution of [Mw/Mn] ratio=1.15.

In N,N-dimethylacetamide (300 mL) was dissolved 300 g of this polymer, and 8.3 g of compound (2) was added. The mixture was stirred in a nitrogen atmosphere at 70° C. for 3 hours to give a reaction mixture containing an acryloyl-terminated poly(n-butylacrylate) (hereinafterreferred to as polymer [3]). From this mixture, N,N-dimethylacetamide was distilled off under reduced pressure. The residue was diluted with toluene and the insoluble fraction was filtered off. From the filtrate, toluene was distilled off under reduced pressure to give a purified polymer [3].

The average number of the terminal acryloyl groups of the purified polymer was 2.0.

Examples 7 to 10

The polymer [3] and diethoxyacetophenone were blended thoroughly in the ratios indicated in Table 1. Each of the resulting compositions was poured into a frame and after degassing by decompression, the surface was covered with a glass sheet to prepare a sample. When the sample was irradiated with a high-pressure mercury lamp (SHL-100UVQ-2; Toshiba Litech) for the duration of time shown in Table 1, a rubbery cured product was obtained. The distance between the high-pressure mercury pump and the sample was maintained at 20 cm.

For each cured product, the gel fraction was determined. The gel fraction was calculated from the weight values before and after extraction of uncured fraction from the cured product. Extraction of the uncured fraction was made by immersing the sample in toluene. The results are shown in Table 1.

TABLE 1

| Example | 7 | 8 | 9 | 10 |
|---|---|---|---|---|
| Polymer [3] (in parts) | 100 | 100 | 100 | 100 |
| Diethoxyacetophenone (in parts) | 5 | 1 | 0.2 | 0.04 |
| Irradiation time (min.) | 5 | 5 | 5 | 15 |
| Gel fraction (%) | 88 | 98 | 96 | 92 |

Examples 11 to 13

Thermal Curing

The polymer [3] and the organic peroxide Perhexa 3 M (1,1-di-(t-butylperoxy)-3,3,5-trimethylsiloxane; Nippon Oils and Fat) were blended in the ratios indicated in Table 2. Each of the resulting compositions was poured into a frame and after degassing by decompression, heated at 150° C. for 5 minutes to give a rubbery cured product.

Each cured product was subjected to determination of gel fraction and tensile testing. The gel fraction was calculated from the weight values before and after extraction of uncured fraction from the cured product. Extraction of the uncured fraction was made by immersing the cured product in toluene. The tensile test was carried out with Shimadzu Autograph using a No. 2 (1/3 ) dumbbell testpiece punched out from the cured sheet (measuring conditions: 23° C., 200 mm/min.). The gel fraction values and tensile test data are both shown in Table 2.

TABLE 2

| Example | 11 | 12 | 13 |
|---|---|---|---|
| Polymer [3] (in parts) | 100 | 100 | 100 |
| Perhexa 3 M (in parts) | 5 | 1 | 0.2 |
| Gel fraction (%) | 96 | 95 | 99 |
| Breaking strength (MPa) | — | 0.30 | 0.36 |
| Elongation at break (%) | — | 39 | 58 |

Example 14

Preparation of a Photocurable Self-adhesive Sheet and an Adhesion Test

A pressure sensitive adhesive composition was prepared by mixing thoroughly 100 parts of polymer [3], 1 part of diethoxyacetophenone and 175 parts of a 40% solution of terpene-phenol tackifier (YS Polyester T115; Yasuhara Chemical) in acetone (70 parts as tackifier).

The pressure sensitive adhesive composition thus obtained was coated on a corona discharge-treated 50 μm-thick polyethylene terephthalate film (Toray) in a dry thickness of about 40 μm and dried i valuo at room temperature. Then, in a nitrogen atmosphere, the film was cured by irradiation with a high-pressure mercury lamp (SHL-100UVQ-2; Toshiba Litech) for 10 minutes. The pressure sensitive adhesive tape thus obtained was subjected to the following test in accordance with JIS Z-0237.

The pressure sensitive adhesive tape prepared as above was slit to 25 mm in width and the adhesive surface was pressure-bonded to a stainless steel sheet (SUS#304) the surface of which had been polished with a #240 water-resistant abrasive paper to prepare a testpiece. The testpiece was allowed to sit for 30 minutes, after which time its adhesion was measured with a tensile tester under the following. conditions: 23° C., 65 RH, peeling speed 300 mm/min, 180 degrees. The result was 8.3 N/25 mm.

Example 15

Preparation of a Thermocurable Self-adhesive Sheet and an Adhesion Test

A pressure sensitive adhesive composition was prepared by mixing thoroughly 100 parts of polymer [3], 1 part of the organic peroxide Perhexa 3 M (1,1-di-(t-butylperoxy)-3,3,5-trimethylcyclohexane; Nippon Oils and Fat) and 175 parts of a 40% solution of terpene-phenol tackifier (YS Polyester T115; Yasuhara Chemical) in acetone (70 parts as tackifier).

The pressure adhesive composition thus obtained was coated on a corona discharge-treated 50 μm-thick polyethylene terephthalate film (Toray) in a dry thickness of about 40 μm and dried in vacuo at room temperature. Then, in a nitrogen atmosphere, the film was cured at 150° C. for 10 minutes. The pressure sensitive adhesive tape thus obtained was subjected to the following test in accordance with JIS Z-0237.

The pressure sensitive adhesive tape prepared as above was slit to 25 mm in width and the adhesive surface was pressure-bonded to a stainless steel sheet (SUS#304) the surface of which had been polished with a #240 water-resistant abrasive paper to prepare a testpiece. The testpiece was allowed to sit for 30 minutes, after which time its adhesion was measured with a tensile tester under the following conditions: 23° C., 65 RH, peeling speed 300 mm/min, 180 degrees. The result was 19.7 N/25 mm.

Example 16

Using a homogenizer, an emulsion was prepared by mixing thoroughly 100 parts of polymer [3], 1 part of diethoxyacetophenone, 100 parts of deionized water and 1 part of sodium dodecyl sulfate (hereinafter referred to as emulsion [1]).

Example 17

Using a homogenizer, an emulsion was prepared by mixing thoroughly 100 parts of polymer [3], 1 part of diethoxyacetophenone, 100 parts of deionized water and 3 parts of nonionic surfactant (Nonion NS-210; Nippon Oils and Fat) (hereinafter referred to as emulsion [2]).

Example 18

Using a homogenizer, an emulsion was prepared by mixing thoroughly 100 parts of polymer [3], 1 part of the organic peroxide Perhexa 3 M (1,1-di-(t-butylperoxy)-3,3, 5-trimethylcyclohexane; Nippon Oils and Fat), 100 parts of deionized water and 1 part of sodium dodecyl sulfate (hereinafter referred to as emulsion [3]).

Example 19

Using a homogenizer, an emulsion was prepared by mixing thoroughly 100 parts of polymer [3], 1 part of the organic peroxide Perhexa 3 M (1,1-di-(t-butylperoxy)-3,3, 5-trimethylcyclohexane; Nippon Oils and Fat), 100 parts of deionized water and 3 parts of nonionic surfactant (Nonion NS-210; Nippon Oils and Fat) (hereinafter referred to as emulsion [4]).

Example 20

Photocuring of Emulsion

Emulsion [1] was coated on a polyethylene terephthalate film and dried by heating at 120° C. for 1 hour. The coated surface was covered with a polyethylene terephthalate film and cured by irradiation with a high-pressure mercury lamp (SHL-100UVQ-2; Toshiba Litech) at an irradiation distance of 20 cm for 5 minutes.

Example 21

Except that emulsion [2] was used in lieu of emulsion [1], the procedure of Example 20 was otherwise repeated to prepare a cured sample.

Example 22

Thermal Curing of an Emulsion

Emulsion [3] was coated on a polyethylene terephthalate film and dried by heating at 120° C. for 1 hour. The coated surface was covered with a polyethylene terephthalate film and cured by heating at 150° C. for 10 minutes.

Example 23

Except that emulsion [4] was used in lieu of emulsion [3], the procedure of Example 22 was otherwise repeated to prepare a cured sample.

INDUSTRIAL APPLICABILITY

The (meth)acryloyl-terminated vinyl polymer of the present invention has a terminal polymeric (meth)acryloyl group introduced in a high proportion so that it can be used advantageously in curable compositions. Moreover, since, in a preferred mode, it is produced by atom transfer radical polymerization, the polymer has characteristics that a high terminal functionality and a narrow molecular weight distribution.

Curable compositions containing this polymer can be cured by means of actinic ray or heat. Moreover, because the main chain of the polymer is comprised of a vinyl polymer, high weathering resistance is insured, while because of said high terminal functionality, elastomeric and other characteristics can be implemented.

The aqueous emulsion of the present invention contains a vinyl polymer having terminal polymerizable (meth) acryloyl groups in a high proportion so that it can be cured by means of heat or light and can be used with advantage in coating applications. Moreover, the cured product has high weathering resistance owing to having the main chain of the vinyl polymer and, at the same time, elastomeric and other characteristics owing to high terminal functionality. Furthermore, since, in a preferred mode, the polymer of the invention is produced by living radical polymerization, more preferably by atom transfer radical polymerization, said physical properties can be freely controlled.

The pressure sensitive adhesive composition of the present invention is of low viscosity because the molecular weight distribution of the main component (meth)acryloyl-containing vinyl polymer is narrow, and is capable of satisfying the high-solid requirement.

In addition, because of the high rate of introduction of said (meth)acryloyl group, a cured product of high gel fraction can be obtained in a short curing time. The product has physical properties well suited for application as a pressure sensitive adhesive.

What is claimed is:

1. A vinyl polymer having at least one terminal group of the general formula (1) per molecule;

$$—OC(O)C(R)=CH_2 \quad (1)$$

wherein R rpresents hydrogen or an organic group containing 1 to 20 carbon atoms, which polymer is obtained by living radical polymerization; and wherien said vinyl polymer comprises a monomeric unit derived from a (meth)acrylic monomer, and wherein the ratio of weight average molecular weight (Mw) to number average molecular weight (Mn) as determined by gel permeation chromatography [Mw/Mn] is not more than 1.3.

2. The vinyl polymer according to claim 1 wherein R is hydrogen or a hydrocarbon group of 1 to 20 carbon atoms.

3. The vinyl polymer according to claim 1 wherein R is hydrogen or a methyl group.

4. The vinyl polymer according to claim 1, which is an acrylic ester polymer.

5. The vinyl polymer according to claim 1 wherein said living radical polymerization is atom transfer radical polymerization.

6. The vinyl polymer according to claim 5 wherein the transition metal complex catalyst for said atom transfer radical polymerization is selected from among complexes of copper, nickel, ruthenium or iron.

7. The vinyl polymer according to claim 6 wherein said tansition metal complex is a copper complex.

8. The vinyl polymer according to claim 1, which is obtained by reacting an olefin polymer having a terminal structure represented by the general formula (2) with a compound represented by the general formula (3):

$$—CR^1R^2X \quad (2)$$

wherein $R^1$ and $R^2$ each represents a group attached to the ethylenically unsaturated group of the vinyl monomer; X represents chloro, bromo or iodo, $$M^{+-}OC(O)C(R)═CH_2 \quad (3)$$

wherein R represents hydrogen or an orgic group containing 1 to 20 carbon atoms; $M^+$ represents an alkai metal or quatemary ammonium ion.

9. The vinyl polymer accoring to claim 1, which is obtained by reacting a hydroxyl-terminated vinyl polymer with a compound of the general formula (4):

$$XC(O)C(R)═CH_2 \quad (4)$$

wherein R represents halogen or an organic group containing 1 to 20 carbon atoms; X represents chloro, bromo, or a hydroxyl group.

10. The vinyl polymer according to claim 1, which is obtained by reacting a hydroxyl-teinated vinyl polymer with a diisocyanate compound and further causing the residual isocyanate group to react with a compound of the general formula (5):

$$HO—R'—OC(O)C(R)═CH_2 \quad (5)$$

wherein R represents hydrogen or an organic group containig 1 to 20 carbon atoms; $R^5$ represents a bivalent orpic group cont 2 to 20 carbon atomns.

11. The vinyl polymer according to claim 8 wherein R is hydrogen or a hydrocarbon group of 1 to 20 carbon atoms.

12. The vinyl polymer according to claim 11 wherein R is hydrogen or a methyl group.

13. The vinyl polymer according to claim 1, the number average molecular weight of which is not less than 3000.

14. A curable composition comprising the vinyl polymer according to claim 1.

15. The curable composition according to claim 14 comprising a radical-polymerizable group-containing monomer and/or oligomer.

16. The curable composition according to claim 14 comprising an anionic-polymerizable group-containing monomer and/or oligomer.

17. The curable composition according to claim 15 comprising a (meth)acryloyl group-containing monomer and/or oligomer.

18. The curable composition according to claim 17 comprising a monomer and/or oligomer contaning a (meth) acryloyl group and having a number average moeular weight of not more than 2000.

19. The curable composition according to claim 14 which is curable by means of actinic ray.

20. The curable composition according to claim 19 comprising a photopolymerization initator.

21. The curable composition according to claim 20 wherein said photopolymerization initiator is a photoradical initiator.

22. The curable conmposition according to claim 20 wherein said photopolymerization initiator is a photoanion initiator.

23. The curable composition according to claim 14 which is curable by heating.

24. The curable composition according to claim 23 wherein a thermopolymerization initiator is selected fom the group consisting of an azo initiator, a peroxide, a persulfate and a redox initiator.

25. An aqueos emulsion comprising the vinyl polymer according to claim 1.

26. An aqueous emulsion comprising the curable composition according to claim 14.

27. A method of protecting a substrate which comprises covering the substrate with the aqueous emulsion according to claim 26 and curing the emulsion in situ.

28. A pressure sensitive adbesive composition comprising the curable composition according to claim 14 or an aqueous emulsion thereof.

29. A pressure sensitive adhesive obtained from the pressure sensitive adhesive composition accolding to claim 28.

* * * * *